United States Patent
Song et al.

(10) Patent No.: US 8,611,306 B2
(45) Date of Patent: Dec. 17, 2013

(54) CONTEXT FETCHING AFTER INTER-SYSTEM HANDOVER

(75) Inventors: Osok Song, San Diego, CA (US); Adrian E. Escott, Reading (GB); Parag A. Agashe, San Diego, CA (US); Ramachandran Subramanian, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 12/684,636

(22) Filed: Jan. 8, 2010

(65) Prior Publication Data

US 2010/0177737 A1 Jul. 15, 2010

Related U.S. Application Data

(60) Provisional application No. 61/144,108, filed on Jan. 12, 2009.

(51) Int. Cl.
*H04W 36/00* (2009.01)

(52) U.S. Cl.
USPC ........... 370/331; 370/338; 380/270; 455/411; 455/436

(58) Field of Classification Search
None
See application file for complete search history.

(56) References Cited

U.S. PATENT DOCUMENTS

| | | | |
|---|---|---|---|
| 2004/0003280 A1* | 1/2004 | Narayanan et al. | 713/200 |
| 2007/0064647 A1* | 3/2007 | Prasad | 370/331 |
| 2009/0025060 A1* | 1/2009 | Mukherjee et al. | 726/3 |
| 2009/0172798 A1* | 7/2009 | Upp | 726/10 |
| 2010/0323700 A1* | 12/2010 | Bachmann et al. | 455/436 |
| 2011/0103340 A1* | 5/2011 | Zhu et al. | 370/329 |

FOREIGN PATENT DOCUMENTS

EP 2007160 12/2008

OTHER PUBLICATIONS

3rd Generation Partnership Project; Technical Specification Group Services and System Aspects: 3GPP System Architecture Evolution (SAE): Security Architecture; (Release 8) Dec. 1, 2008, 3GPP Standard; 3GPP TS 33.401, 3rd Generation Partner.
3rd Generation Partnership Project; Technical Specification Group Services and System Aspects; Rationale and track of security decisions in Long Term Evolved (LTE) RAN / 3GPP System Architecture Evolution (SAE) (Release 8) 3GPP Standard; 3GPP TR 33.821, 3.
International Search Report and Written Opinion—PCT/US2010/020806, International Search Authority—European Patent Office—Sep. 23, 2010.

* cited by examiner

*Primary Examiner* — Chi Pham
*Assistant Examiner* — Shick Hom
(74) *Attorney, Agent, or Firm* — Kam T. Tam

(57) ABSTRACT

Systems and methodologies are described that facilitate fetching a native security context between network nodes in a core network after an inter-system handover of a mobile device. For instance, a mobility message that is integrity protected by a security context (e.g., the native security context, a mapped security context, . . . ) can be obtained at a network node from the mobile device. Further, the network node can send a request to a disparate network node within a core network. The request can include information that can be used by the disparate network node to establish that the mobile device is authenticated. Moreover, the native security context can be received from the disparate network node in response to the request. Accordingly, the native security context need not be recreated between the network node and the mobile device.

75 Claims, 16 Drawing Sheets

US 8,611,306 B2

CONTEXT FETCHING AFTER INTER-SYSTEM HANDOVER

CLAIM OF PRIORITY UNDER 35 U.S.C. §119

The present Application for Patent claims priority to Provisional Application No. 61/144,108 entitled "METHOD AND APPARATUS TO ENABLE SECURITY PROTECTION OF A TRACKING UPDATE MESSAGE AFTER INTER-SYSTEM HANDOVER FROM UTRAN/GERAN TO E-UTRAN FOR CONTEXT FETCHING BETWEEN MOBILITY MANAGEMENT ENTITIES" filed Jan. 12, 2009, and assigned to the assignee hereof and hereby expressly incorporated by reference herein.

BACKGROUND

1. Field

The following description relates generally to wireless communications, and more particularly to implementing context fetching between network nodes after inter-system handover in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In a wireless communication network, a mobile device can register with a network node of a core network to establish a security relationship. A security context for the security relationship can be generated, and the security context can be retained by the mobile device and the network node. The security context can be utilized, for example, to integrity protect a message sent by the mobile device to the network node; the message can be sent over the air to a base station, and the base station can thereafter send the message to the network node of the core network. The network node can check the integrity of the received message by employing the security context. Following this example, the security context can include a key shared between the network node and the mobile device.

Moreover, the mobile device can handover between disparate types of systems. According to an example, the mobile device can establish a security relationship with a first network node of a first type of system, thereby yielding a first security context that can be retained by both the mobile device and the first network node of the first type of system. Thereafter, the mobile device can handover to a second type of system. Thus, a security relationship with a second network node of the second type of system can be established, and a second security context corresponding to this security relationship can be retained by both the mobile device and the second network node of the second type of system. Moreover, the mobile device and the first network node of the first type of system can continue to retain the first security context subsequent to the handover to the second type of system.

Further, the mobile device can again handover back to the first type of system. As part of the handover procedure, a mapped security context for the first type of system can be derived from the second security context for the second type of system. Moreover, the mobile device can send a message to a third network node included in the core network of the first type of system, where the third network node can differ from the first network node that has the first security context for the mobile device. Accordingly, the third network node can attempt to fetch the first security context from the first network node rather than causing the mobile device to reestablish the security relationship, and thus, recreating the first security context for the first type of system can be mitigated. Recreation of the first security context can be costly in terms of latency, processing, bandwidth usage, etc. due to retrieval of authentication materials (e.g., from a Home Subscriber Server (HSS), . . . ), effectuating authentication of the mobile device, and so forth. By fetching the first security context retained by the first network node instead of recreating such security context, these costs can be diminished. When employing convention techniques, however, a network node oftentimes is unable to fetch a security context from a disparate network node within a core network associated with a type of system after an inter-system handover.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating fetching of a native security context between network nodes in a core network after an inter-system handover of a mobile device. For instance, a mobility message that is integrity protected by a security context (e.g., the native security context, a mapped security context, . . . ) can be obtained at a network node from the mobile device. Further, the network node can send a request to a disparate network node within a core network. The request can include information that can be used by the disparate network node to establish that the mobile device is authenticated. Moreover, the native security context can be received from the disparate network node in response to the request. Accordingly, the native security context need not be recreated between the network node and the mobile device.

According to related aspects, a method is described herein. The method can include receiving a mobility message integrity protected by a security context at a network node from a mobile device after an inter-system handover of the mobile device. Further, the method can include sending a request for a native security context to a disparate network node within a core network, the request includes information utilized by the disparate network node to ensure that the mobile device is authenticated. Moreover, the method can include receiving the native security context from the disparate network node in response to the request.

Another aspect relates to a wireless communications apparatus. The wireless communications apparatus can include at least one processor. The at least one processor can be configured to obtain a mobility message integrity protected by a security context at a network node from a mobile device after an inter-system handover of the mobile device. Moreover, the at least one processor can be configured to transmit a request for a native security context to a disparate network node, the request includes information utilized by the disparate network node to verify that the mobile device is authenticated. Further, the at least one processor can be configured to obtain the native security context from the disparate network node in response to the request.

Yet another aspect relates to an apparatus. The apparatus can include means for obtaining a mobility message integrity protected by a security context from a mobile device after an inter-system handover of the mobile device. Moreover, the apparatus can include means for fetching a native security context from a disparate network node within a core network utilizing a request that includes information employed by the disparate network node to establish that the mobile device is authenticated.

Still another aspect relates to a computer program product that can comprise a computer-readable medium. The computer-readable medium can include code for causing at least one computer to receive a mobility message integrity protected by a security context from a mobile device after an inter-system handover of the mobile device. Further, the computer-readable medium can include code for causing at least one computer to fetch a native security context from a disparate network node within a core network utilizing a request that includes information employed by the disparate network node to establish that the mobile device is authenticated.

Yet another aspect relates to an apparatus that can include an authentication component that yields information to be utilized by a disparate network node to verify that a mobile device is authenticated. The apparatus can also include a context fetch component that generates a request for a native security context from the disparate network node in response to a mobility message received from the mobile device, the request includes the information to be utilized by the disparate network node to verify that the mobile device is authenticated.

In accordance with other aspects, a method is described herein. The method can include receiving a request for a native security context of a mobile device retained in memory of a network node from a differing network node within a core network, the request responsive to a mobility message integrity protected by a security context from the mobile device after an inter-system handover of the mobile device. The method can also include authenticating the mobile device based at least in part upon information included in the request. Moreover, the method can include sending the native security context to the differing network node when the mobile device is authenticated.

Another aspect relates to a wireless communications apparatus. The wireless communications apparatus can include at least one processor. The at least one processor can be configured to receive a request for a native security context of a mobile device retained in memory of a network node from a differing network node within a core network, the request responsive to a mobility message integrity protected by a security context from the mobile device after an inter-system handover of the mobile device; authenticate the mobile device based at least in part upon information included in the request; and send the native security context to the differing network node when the mobile device is authenticated.

Yet another aspect relates to an apparatus. The apparatus can include means for obtaining a request for a native security context of a mobile device from a differing network node within a core network. Still yet, the apparatus can include means for authenticating the mobile device based at least in part upon information included in the request. Further, the apparatus can include means for transmitting the native security context to the differing network node when the mobile device is authenticated.

Still another aspect relates to a computer program product that can comprise a computer-readable medium. The computer-readable medium can include code for causing at least one computer to obtain a request for a native security context of a mobile device from a differing network node within a core network. Moreover, the computer-readable medium can include code for causing at least one computer to authenticate the mobile device based at least in part upon information included in the request. Further, the computer-readable medium can include code for causing at least one computer to transmit the native security context to the differing network node when the mobile device is authenticated.

Yet another aspect relates to an apparatus that can include an authentication component that authenticates a mobile device based at least in part upon information included in a request for a native security context received from a differing network node within a core network. The apparatus can also include a context forward component that sends the native security context to the differing network node when the mobile device is authenticated.

According to other aspects, a method is described herein. The method can include generating a mobility message after an inter-system handover. Moreover, the method can include protecting an integrity of the mobility message utilizing a security context to yield an integrity protected mobility message. Further, the method can include transmitting the integrity protected mobility message intended for a network node in a core network, the integrity protected mobility message utilized by the network node to fetch a native security context from a disparate network node.

Another aspect relates to a wireless communications apparatus. The wireless communications apparatus can include at least one processor. The at least one processor can be configured to generate a mobility message after an inter-system handover. Moreover, the at least one processor can be configured to protect an integrity of the mobility message utilizing a security context to yield an integrity protected mobility message. Further, the at least one processor can be configured to transmit the integrity protected mobility message intended for a network node in a core network, the integrity protected mobility message utilized by the network node to fetch a native security context from a disparate network node.

Yet another aspect relates to an apparatus. The apparatus can include means for yielding a mobility message after an inter-system handover; means for protecting an integrity of the mobility message employing a security context to generate an integrity protected mobility message; and means for transmitting the integrity protected mobility message, the integrity protected mobility message being utilized by a network node to fetch a native security context from a disparate network node in a core network.

Still another aspect relates to a computer program product that can comprise a computer-readable medium. The computer-readable medium can include code for causing at least one computer to yield a mobility message after an inter-system handover. The computer-readable medium can further include code for causing at least one computer to protect an integrity of the mobility message employing a security context to generate an integrity protected mobility message. Moreover, the computer-readable medium can include code for causing at least one computer to transmit the integrity protected mobility message, the integrity protected mobility message being utilized by a network node to fetch a native security context from a disparate network node in a core network.

Yet another aspect relates to an apparatus that can include an area update component that yields a mobility message after an inter-system handover. The apparatus can also include an integrity protection component that protects an integrity of the mobility message using one of a native security context or a mapped security context to yield an integrity protected mobility message for transmission to a network node in a core network and utilized by the network node to fetch the native security context from a disparate network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
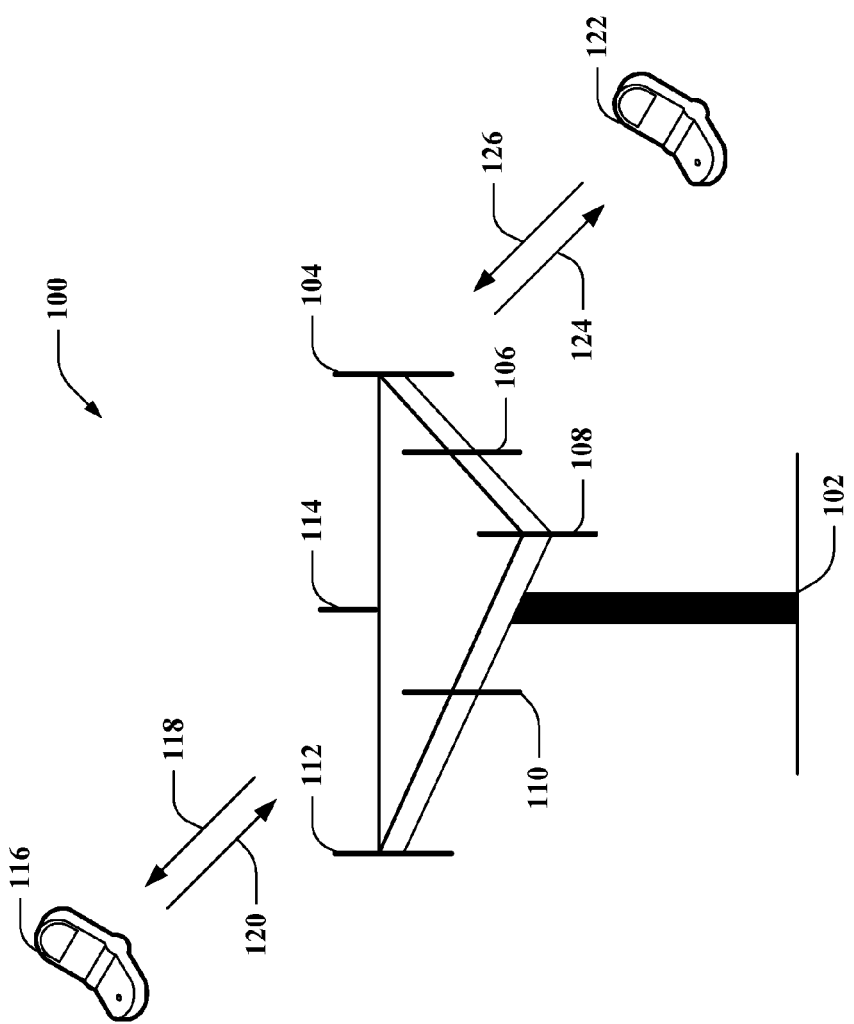
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. Wireless communication system 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 can be a bridge between mobile devices 116 and 122 and a core network (not shown). For instance, when a mobile device (e.g., mobile device 116, mobile device 122, ... ) registers with a core network of a particular type of system to yield a security context, messages can be exchanged between the mobile device and a network node of the core network via base station 102. Moreover, mobility messages associated with an area update procedure (e.g., Tracking Area Update (TAU) procedure, ... ) can be integrity protected with the security context and transferred between the mobile device and the core network (e.g., the network node, a disparate network node, ... ) via base station 102.

For example, base station 102 can be part of an Evolved UMTS Terrestrial Radio Access Network (E-UTRAN) and the core network of a Long Term Evolution (LTE) system can be an Evolved Packet System (EPS) core network. The EPS core network can include network nodes such as, for instance, one or more Mobility Management Entities (MMES), one or more Serving Gateways (SGWs), one or more Packet Data Network Gateways (PDN GWs), one or more Authentication, Accounting and Authorization/Home Subscriber Servers (AAA/HSSs), and so forth. Base station 102 can be coupled to an MME via an S1-MME interface, and base station 102 can be coupled to an SGW via an S1-U interface. Following this example, a mobile device (e.g., an E-UTRAN capable mobile device such as mobile device 116, mobile device 122, ... ) can establish a security relationship with the EPS core network to yield a corresponding security context by registering with an MME. Base station 102 can transport messages transferred between the mobile device and the MME utilized for establishing the security relationship and/or associated with an area update procedure.

According to another example, base station 102 can be part of a UMTS Terrestrial Radio Access Network (UTRAN) or a GSM Enhanced Data rates for GSM Evolution (EDGE) Radio Access Network (GERAN). Further, the core network associated with a UTRAN/GERAN system can include one or more Mobile Switching Centers (MSCs), one or more Serving General Packet Radio Service (GPRS) Support Nodes (SGSNs), and so forth. Pursuant to this example, a mobile device (e.g., a UTRAN capable mobile device such as mobile device 116, mobile device 122, ... ) can establish a security relationship with an SGSN to yield a corresponding security context by registering with such SGSN. Accordingly, base station 102 can transport messages transferred between the mobile device and the SGSN employed for establishing the security relationship and/or associated with an area update procedure. Further, any disparate type of system other than an E-UTRAN system or a UTRAN/GERAN system is contemplated to fall within the scope of the hereto appended claims.

Figure 2:
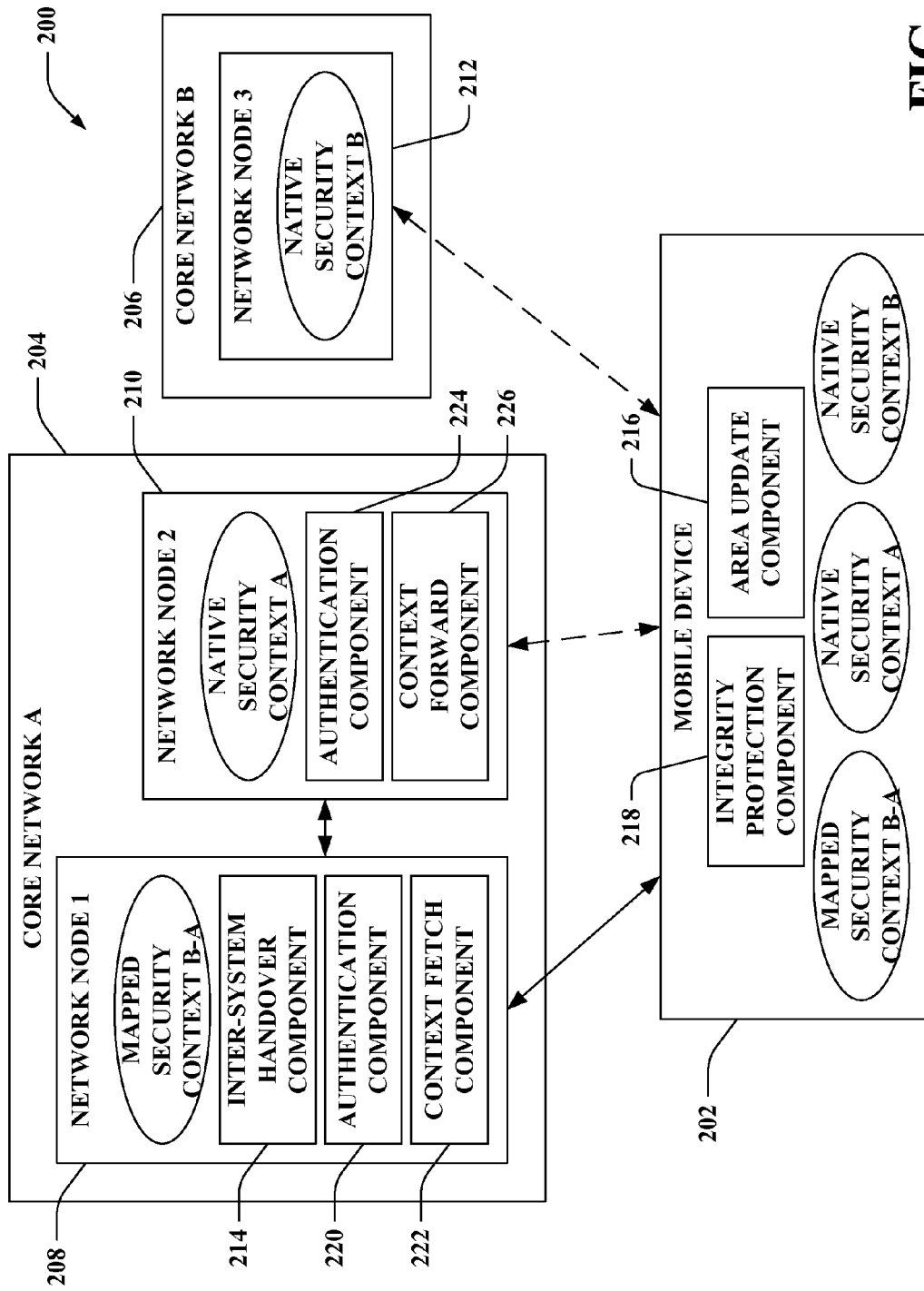
FIG. 2 is an illustration of an example system that supports fetching a security context between network nodes in a wireless communication environment.

Now turning to FIG. 2, illustrated is a system 200 that supports fetching a security context between network nodes in a wireless communication environment. System 200 includes a mobile device 202. Mobile device 202 can transmit and/or receive information, signals, data, instructions, commands, bits, symbols, and the like. Moreover, although not shown, it is contemplated that system 200 can include any number of mobile devices similar to mobile device 202. Mobile device 202 can communicate with one or more base stations (not shown) (e.g., base station 102 of FIG. 1, ... ) via the forward link and/or reverse link. The one or more base stations can each transmit and/or receive information, signals, data, instructions, commands, bits, symbols, and the like. The one or more base stations can be associated with different types of system (e.g., a first subset of base stations can be from a first type of radio access network and a second subset of base stations can be from a second type of radio access network, ... ).

System 200 can further include a plurality of core networks. As depicted, system 200 includes core network A 204 and core network B 206; yet, it is contemplated that any number of additional core networks can be included in system 200 and are intended to fall within the scope of the hereto appended claims. Core network A 204 and core network B 206 can each be associated with a respective type of system. By way of example, core network A 204 can be an EPS core network associated with an E-UTRAN system, and core network B 206 can be a core network associated with a UTRAN/GERAN system; yet, it is contemplated that any disparate number and/or type of system is intended to fall within the scope of the claimed subject matter.

Core network A 204 can include a plurality of respective network nodes, and core network B 206 can include a plurality of respective network nodes. In the illustrated example, core network A 204 can include network node 1 208 and network node 2 210, and core network B 206 can include network node 3 212. Yet, it is contemplated that the claimed subject matter is not limited to this example since core network A 204 can include substantially any number of network nodes and/or core network B 206 can include substantially any number of network nodes.

Moreover, a security relationship can be established between mobile device 202 and core network A 204 as well as between mobile device 202 and core network B 206. According to an example, mobile device 202 could have previously camped on a base station (not shown) associated with network node 2 210 of core network A 204. Thus, mobile device 202 could have registered with network node 2 210 to yield a native security context A (e.g., a security context for core network A 204, ... ). The native security context A can be retained by both mobile device 202 and network node 2 210 (e.g., upon registration, subsequent to handing over to a disparate type of system such as a system associated with core network B 206, ... ). Further, mobile device 202 could have also previously camped on a base station (not shown) associated with network node 3 212 of core network B 206. Hence, mobile device 202 could have registered with network node 3 212 to generate a native security context B (e.g., a security context for core network B 206, ... ). Moreover, the native security context B can be retained by both mobile device 202 and network node 3 212. Further, the native security context A can be more secure than the native security context B.

Network node 1 208 can further include an inter-system handover component 214. Inter-system handover component 214 can interact with mobile device 202 to effectuate a handover procedure where mobile device 202 hands over from a system associated with core network B 206 to a system associated with core network A 204. Further, inter-system handover component 214 and mobile device 202 (e.g., an inter-system handover component (not shown) of mobile device 202, ... ) can create a mapped security context B-A derived from native security context B that mobile device 202 utilized in the system associated with core network B 206. The mapped security context B-A can be a security context corresponding to core network A 204, yet generated from a native security context corresponding to core network B 206. For example, since mobile device 202 hands over from the system associated with core network B 206 with a security relationship (e.g., native security context B, . . . ) established with network node 3, then network node 3 212 can pass information to network node 1 208 of core network A 204 used to derive the mapped security context B-A. Accordingly, after a handover from the system associated with core network B 206 to the system associated with core network A 204, the mapped security context B-A can be yielded by inter-system handover component 214 and retained by both network node 1 208 and mobile device 202.

The native security context B, from which the mapped security context B-A is derived, can be weaker than the native security context A; thus, the native security context A can be more secure (e.g., higher level of trust, . . . ) as compared to the native security context B or the mapped security context B-A. According to an example, keys of the native security context B can be passed within the system associated with core network B 206. Thus, the keys of the native security context B can be passed to radio network elements from network node 3 212. In contrast, keys of the native security context A can be retained in core network A 204 and not passed elsewhere. Hence, the keys can be passed within core network A 204 (e.g., between network node 1 208 and network node 2 210, . . . ), while the keys are not passed to radio network elements; rather, disparate keys can be derived from the keys of the native security context A retained within core network A 204 for distribution to radio network elements. It is to be appreciated, however, that the claimed subject matter is not limited to the foregoing example.

Mobile device 202 can further include an area update component 216 and an integrity protection component 218. After the inter-system handover from the system associated with core network B 206 to the system associated with core network A 204, area update component 216 of mobile device 202 can perform an area update procedure. The area update procedure effectuated by area update component 216 can be a TAU procedure or the like. Area update component 216 can generate a mobility message (e.g., a TAU request message, . . . ). Further, integrity protection component 218 can integrity protect the mobility message using the mapped security context B-A or the native security context A (e.g., depending upon the approach implemented as described herein, . . . ). For instance, integrity protection component 218 can compute a Message Authentication Code (MAC) from a counter, a key (e.g., from a corresponding security context, . . . ), and the mobility message (e.g., a clear text message, . . . ). The key can be from the mapped security context B-A or the native security context A depending upon the approach implemented as described herein. Moreover, the MAC can be appended to the mobility message by integrity protection component 218 to yield an integrity protected mobility message. It is further contemplated that the integrity protected mobility message can also include the counter. Area update component 216 can send the integrity protected mobility message to a newly camped upon base station (not shown). The base station can further transport the integrity protected mobility message to network node 1 208 of core network A 204 corresponding to the base station.

The integrity protected mobility message can be received at network node 1 208. By way of example, if network node 1 208 has retained the native security context A (not shown) (e.g., mobile device 202 previously registered with network node 1 208, the native security context A was previously fetched by network node 1 208, . . . ) and the integrity protected mobility message is integrity protected with the mapped security context B-A (e.g., by integrity protection component 218, . . . ), then network node 1 208 can send a response to mobile device 202 indicating that network node 1 208 has the native security context A. Further, network node 1 208 can signal to mobile device 202 to utilize the native security context A under the foregoing example scenario.

According to another example, network node 1 208 can lack the native security context A. Thus, the integrity protected mobility message can be sent to network node 1 208 (e.g., a new network node, . . . ), which is different from network node 2 210 (e.g., an old network node, . . . ) that has the native security context A for mobile device 202. In this case, network node 1 208 can fetch a previously stored native security context A from network node 2 210.

Network node 1 208 can further include an authentication component 220 and a context fetch component 222. Moreover, network node 2 210 can include an authentication component 224 and a context forward component 226. Although not shown, it is contemplated that network node 1 208 and network node 2 210 can be substantially similar (e.g., network node 1 208 can further include a context forward component similar to context forward component 226, network node 2 210 can further include an inter-system handover component similar to inter-system handover component 214 and/or a context fetch component similar to context fetch component 222, . . . ).

Authentication component 220 and authentication component 224 can operate in conjunction employing one or more of the approaches described herein to authenticate mobile device 202. Context fetch component 222 can send a message to network node 2 210 to request the native security context A. The message transmitted by context fetch component 222 can be the integrity protected mobility message, a context request message, or the like. For example, the message transmitted by context fetch component 222 can include information yielded by authentication component 220 that can be utilized by authentication component 224 of network node 2 210 to ensure, verify, establish, etc. that mobile device 202 is authenticated. When mobile device 202 is successfully authenticated by authentication component 220 and/or authentication component 224, context forward component 226 can send the native security context A to network node 1 208. Alternatively, when authentication of mobile device 202 effectuated by authentication component 220 and/or authentication component 224 is unsuccessful, context forward component 226 can inhibit transmission of the native security context A to network node 1 208; rather, under such a scenario, a failure can be reported (e.g., to network node 1 208, . . . ).

According to an example, the mobility message can be integrity protected by integrity protection component 218 using the mapped security context B-A to generate the integrity protected mobility message. Moreover, additional parameters yielded based upon the native security context A retained by mobile device 202 can be included in the integrity protected mobility message (e.g., the additional parameters can be carried by optional information elements (IEs) in the integrity protected mobility message, . . . ) sent by area update component 216 to network node 1 208. For instance, authentication component 220 of network node 1 208 can replace actual parameters (e.g., yielded based upon the mapped security context B-A, . . . ) from the integrity protected mobility message with the additional parameters (e.g., yielded based upon the native security context A, . . . ), and context fetch component 222 can send the modified integrity protected mobility message to network node 2 210. Authentication component 224 of network node 2 210 can check the integrity of the modified integrity protected mobility message using the native security context A. If the message is successfully verified by authentication component 224, then context forward component 226 can send the native security context A to network node 1 208. Alternatively, if the message is not successfully verified by authentication component 224, then a failure can be reported to network node 1 208 and sending of the native security context A can be inhibited. By way of another illustration, authentication component 220 of network node 1 208 can cause context fetch component 222 to forward the integrity protected mobility message including the additional parameters carried by the optional IEs received from mobile device 202, and authentication component 224 can replace the actual parameters with the additional parameters and thereafter check the integrity of the modified integrity protected mobility message using the native security context A. Further, context forward component 226 can transmit the native security context A to network node 1 208 if the message is successfully verified by authentication component 224; alternatively, a failure can be reported if the message is unsuccessfully verified.

Pursuant to a further example, the mobility message can be integrity protected by integrity protection component 218 using the mapped security context B-A to generate the integrity protected mobility message, which can be transmitted to network node 1 208 by area update component 216. Authentication component 220 can check the integrity of the integrity protected mobility message employing the mapped security context B-A. If the message is successfully verified by authentication component 220, then context fetch component 222 can generate a context request message that includes an identifier corresponding to mobile device 202 and an indication that mobile device 202 has been successfully authenticated. Moreover, context fetch component 222 can send the context request message to network node 2 210. Authentication component 224 can evaluate the context request message to recognize that mobile device 202 has been successfully authenticated by network node 1 208. Further, context forward component 226 can send the native security context A to network node 1 208 in response.

By way of yet another example, the mobility message can be integrity protected by integrity protection component 218 using the native security context A retained by mobile device 202 to generate the integrity protected mobility message, which can be transmitted to network node 1 208 by area update component 216. Network node 1 208 can lack the native security context A when the integrity protected mobility message is received. Authentication component 220 of network node 1 208 can cause context fetch component 222 to forward the integrity protected mobility message to network node 2 210. Authentication component 224 of network node 2 210 can check the integrity of the integrity protected mobility message utilizing the native security context A. If the message is successfully verified by authentication component 224, then context forward component 226 can send the native security context A to network node 1 208 as part of a context response message; otherwise, if the message is not successfully verified by authentication component 224, then a failure can be reported to network node 1 208 as part of the context response message. Moreover, network node 1 208 can send a message to mobile device 202 indicating which security context (e.g., the native security context A, the mapped security context B-A, . . . ) to utilize for subsequent messages (e.g., subsequent Non-Access Stratum (NAS) messages, . . . ) based upon the context response message received from network node 2 210.

Figure 3:
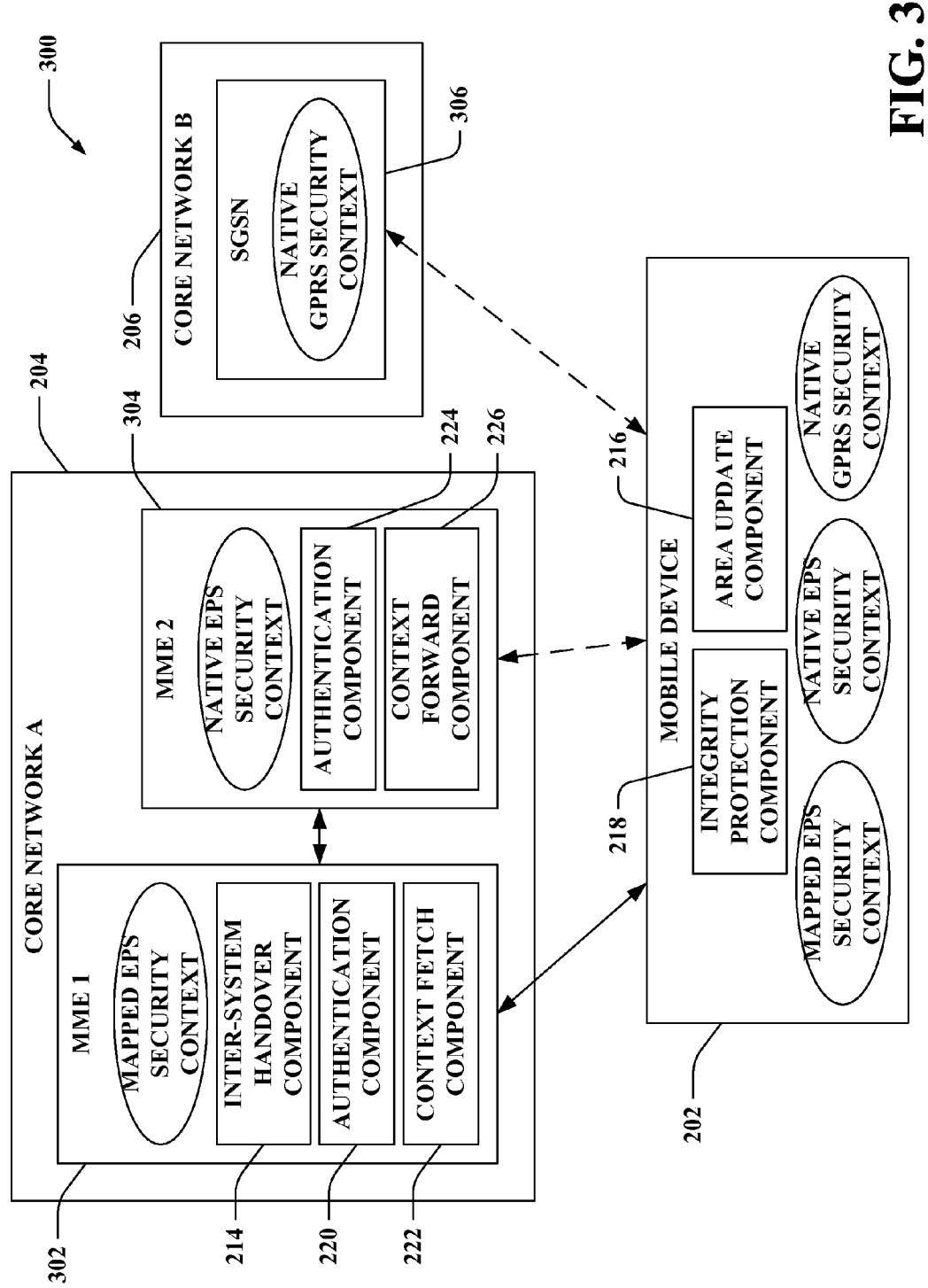
FIG. 3 is an illustration of an example system that provides security protection of a TAU request message after inter-system handover from UTRAN/GERAN to E-UTRAN in a wireless communication environment.

Now referring to FIG. 3, illustrated is a system 300 that provides security protection of a TAU request message after inter-system handover from UTRAN/GERAN to E-UTRAN in a wireless communication environment. System 300 includes mobile device 202 (e.g., which can further include area update component 216 and integrity protection component 218, . . . ), core network A 204, and core network B 206. Core network A 204 can be an EPS core network associated with an E-UTRAN system, and core network B 206 can be a core network associated with a UTRAN/GERAN system.

Core network A 204 can include an MME 1 302 and an MME 2 304. MME 1 302 can further include inter-system handover component 214, authentication component 220, and context fetch component 222. Further, MME 2 304 can include authentication component 224 and context forward component 226. Although not shown, it is contemplated that MME 1 302 and MME 2 304 can be substantially similar to each other. Moreover, core network B 206 can include a SGSN 306.

Mobile device 202 could have previously established a security relationship with core network A 204 (e.g., EPS core network, . . . ) by registering with MME 2 304. The security context for this security relationship can be called a native EPS security context (e.g., native security context A, . . . ), and can be stored by mobile device 202 and MME 2 304. Mobile device 202 and MME 2 304 can continue to retain the native EPS security context when mobile device 202 moves to a UTRAN/GERAN system associated with core network B 206.

Further, upon moving to the UTRAN/GERAN system, mobile device 202 could have previously established a security relationship with core network B 206 by registering with SGSN 306. The security context for this security relationship can be called a native General Packet Radio Service (GPRS) security context (e.g., native security context B, . . . ).

When mobile device 202 hands over from the UTRAN/GERAN system to the E-UTRAN system, as part of the handover procedure, mobile device 202 and MME 1 302 (e.g., inter-system handover component 214, . . . ) can create an EPS security context derived from the native GPRS security context that mobile device 202 used in the UTRAN/GERAN system. The derived security context can be referred to as a mapped EPS security context (e.g., mapped security context B-A, . . . ).

After the handover from the UTRAN/GERAN system to the E-UTRAN system, mobile device 202 can perform a TAU procedure if mobile device 202 is not yet registered to the Tracking Area of a newly camped E-UTRAN cell (e.g., associated with MME 1 302, . . . ). More particularly, area update component 216 can yield a TAU request message. Further, integrity protection component 218 can integrity protect the TAU request message. According to an example, integrity protection component 218 can protect the TAU request message with the mapped EPS security context created during the handover procedure. By way of another example, integrity protection component 218 can protect the TAU request message with the native EPS security context retained by mobile device 202, while MME 1 302 can lack the native EPS security context at such time (e.g., prior to fetching from MME 2 304, . . . ).

Area update component 216 can send the TAU request message to MME 1 302, which differs from MME 2 304 that has stored the native EPS security context for mobile device 202. Thus, context fetch component 222 can send a message to fetch the native EPS security context from MME 2 304, and context forward component 226 can provide the native EPS security context to MME 1 302 or a failure notification in response to the message.

Conventionally, fetching of the native EPS security context from MME 2 304 typically is unable to be effectuated since a technique similar to an inter-MME TAU procedure is oftentimes implemented. For instance, in a common TAU procedure that causes a change of MMEs (e.g., inter-MME TAU procedure, . . . ), a TAU request message can be integrity protected by a current native EPS security context for a mobile device. A new MME that receives the TAU request message can send the entire TAU request message to an old MME to check the integrity protection of the message. If integrity protection fails, then the old MME does not send the current native EPS security context for the mobile device to the new MME; rather, a failure can be reported by the old MME to the new MME. Thus, conventional approaches where a TAU request message is integrity protected by a current security context which happens to be the mapped EPS security context, and not the native EPS security context that is being fetched, can be unable to be verified by MME 2 304 when MME 2 304 receives the TAU request message forwarded from MME 1 302. Under the conventional approach, MME 2 304 can be unable to check the integrity protection of the forwarded message because MME 2 304 lacks the mapped EPS security context (e.g., the current security context, . . . ). In contrast, the techniques described herein for fetching the native EPS security context (e.g., native security context A, . . . ) retained by MME 2 304 can mitigate the foregoing.

FIGS. 4-7 illustrate example systems that implement various approaches for fetching security contexts between network nodes after inter-system handover. Although not shown, it is to be appreciated that a combination of these approaches can be utilized. For these example systems (and similarly to the examples described in FIGS. 2 and 3), mobile device 202 could have previously established a security relationship with core network A 204 (e.g., by registering with network node 2 210, . . . ) to generate the native security context A (e.g., native EPS security context, . . . ) and could have previously established a security relationship with a disparate core network (not shown) (e.g., core network B 206 of FIG. 2, . . . ) to generate the native security context B (e.g., GPRS security context, . . . ). Moreover, the native security context A can be more secure than the native security context B. Further, mobile device 202 can handover from a system (e.g., a UTRAN/GERAN system, . . . ) associated with the disparate core network to a system (e.g., an E-UTRAN system, . . . ) associated with core network A 204. As part of the handover procedure, network node 1 208 (e.g., inter-system handover component 214, . . . ) and mobile device 202 can derive the mapped security context B-A (e.g., EPS security context, . . . ) from the native security context B (e.g., native GPRS security context, . . . ). After the handover, mobile device 202 can yield a mobility message with area update component 216. Area update component 216 can employ a TAU procedure or the like (e.g., the mobility message can be a TAU request message, . . . ). Moreover, integrity protection component 218 can integrity protect the mobility message as described herein for transmission to network node 1 208 via a base station (not shown).

Figure 4:
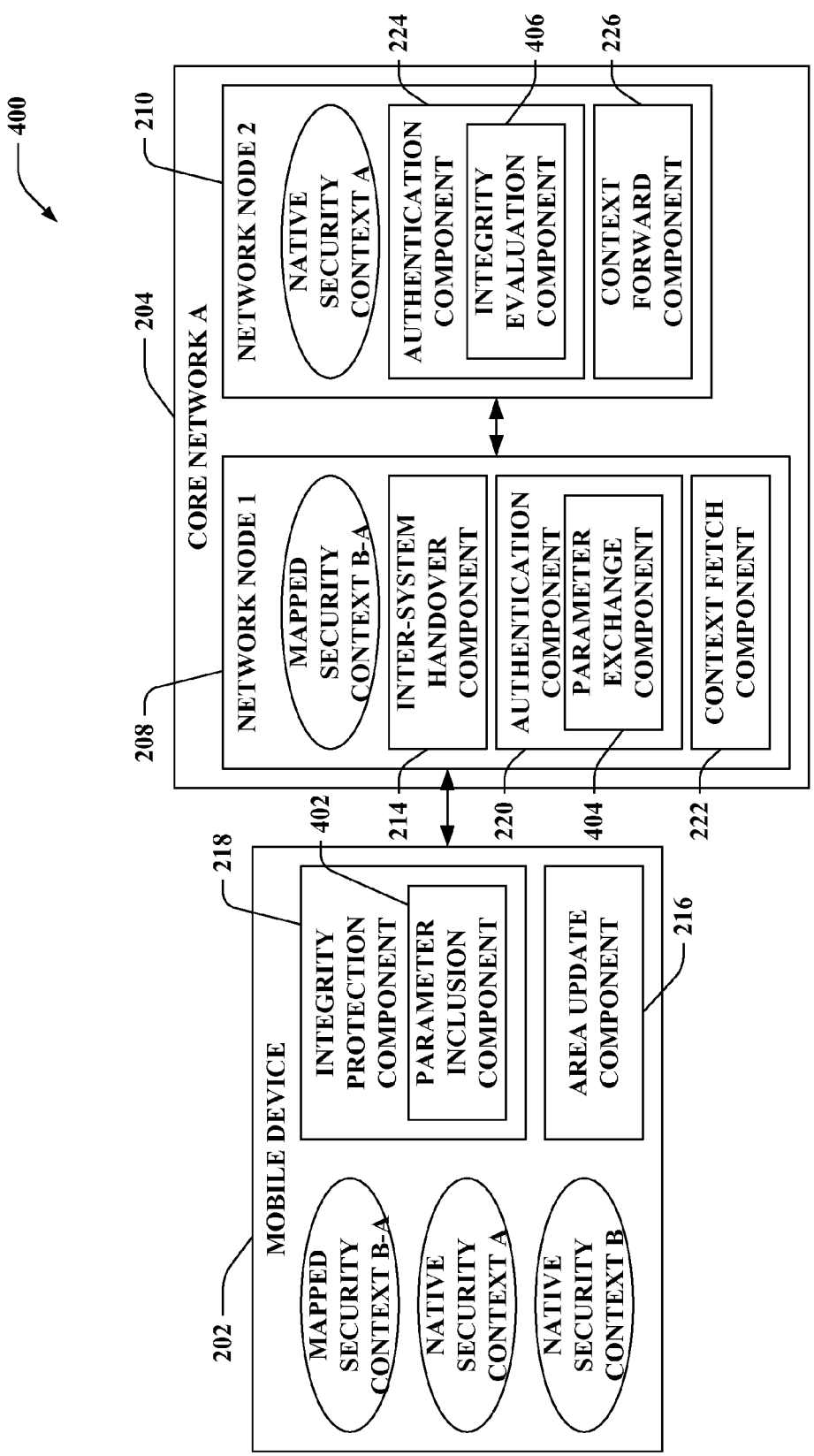
FIG. 4 is an illustration of an example system that leverages additional parameters included in a mobility message for fetching a security context in a wireless communication environment.

Now referring to FIG. 4, illustrated is a system 400 that leverages additional parameters included in a mobility message for fetching a security context in a wireless communication environment. In system 400, integrity protection component 218 of mobile device 202 can further include a parameter inclusion component 402. Parameter inclusion component 402 can yield additional parameters that can be incorporated into an integrity protected mobility message for transmission to network node 1 208.

By way of illustration, area update component 216 can yield the mobility message. Integrity protection component 218 can utilize the mapped security context B-A (e.g., mapped EPS security context, . . . ) to integrity protect the mobility message. For instance, integrity protection component 218 can compute a NAS MAC from a NAS uplink counter (e.g., associated with the mapped security context B-A, . . . ), a key (e.g., from the mapped security context B-A, . . . ), and the mobility message (e.g., a clear text message, . . . ). Integrity protection component 218 can append the NAS MAC to the mobility message (e.g., along with the NAS uplink counter, . . . ) to yield an integrity protected mobility message. Further, parameter inclusion component 402 can compute a disparate NAS MAC from a disparate NAS uplink counter (e.g., associated with the native security context A retained by mobile device 202, . . . ), a disparate key (e.g., from the native security context A retained by mobile device 202, . . . ), and the mobility message. Parameter inclusion component 402 can further incorporate the disparate NAS MAC and the disparate NAS uplink counter associated with the native security context A retained by mobile device 202 in optional IEs in the integrity protected mobility message. Moreover, area update component 216 can transmit the integrity protected mobility message with the optional IEs that carry the disparate NAS MAC and the disparate NAS uplink counter associated with the native security context A.

Network node 1 208 can obtain the integrity protected mobility message with the optional IEs that carry the disparate NAS MAC and the disparate NAS uplink counter associated with the native security context A. Authentication component 220 can further include a parameter exchange component 404 that can exchange parameters from the integrity protected mobility message with parameters carried by the optional IEs. More particularly, parameter exchange component 404 can substitute the NAS MAC and the NAS uplink counter from the integrity protected mobility message corresponding to the mapped security context B-A (e.g., the NAS MAC yielded based upon a key from the mapped security context B-A, the NAS uplink counter associated with the mapped security context B-A, . . . ) with the disparate NAS MAC and the disparate NAS uplink counter associated with the native security context A carried by the optional IEs to yield a modified integrity protected mobility message.

Context fetch component 222 can thereafter send the modified integrity protected mobility message to network node 2 210. Authentication component 224 of network node 2 210 can further include an integrity evaluation component 406 that can check an integrity of the modified integrity protected mobility message utilizing the native security context A. If the integrity check by integrity evaluation component 406 is successful, then context forward component 226 can send the native security context A to network node 1 208. Alternatively, if the integrity check by integrity evaluation component 406 is unsuccessful, then a failure can be reported to network node 1 208 and sending of the native security context A to network node 1 208 can be inhibited.

Figure 5:
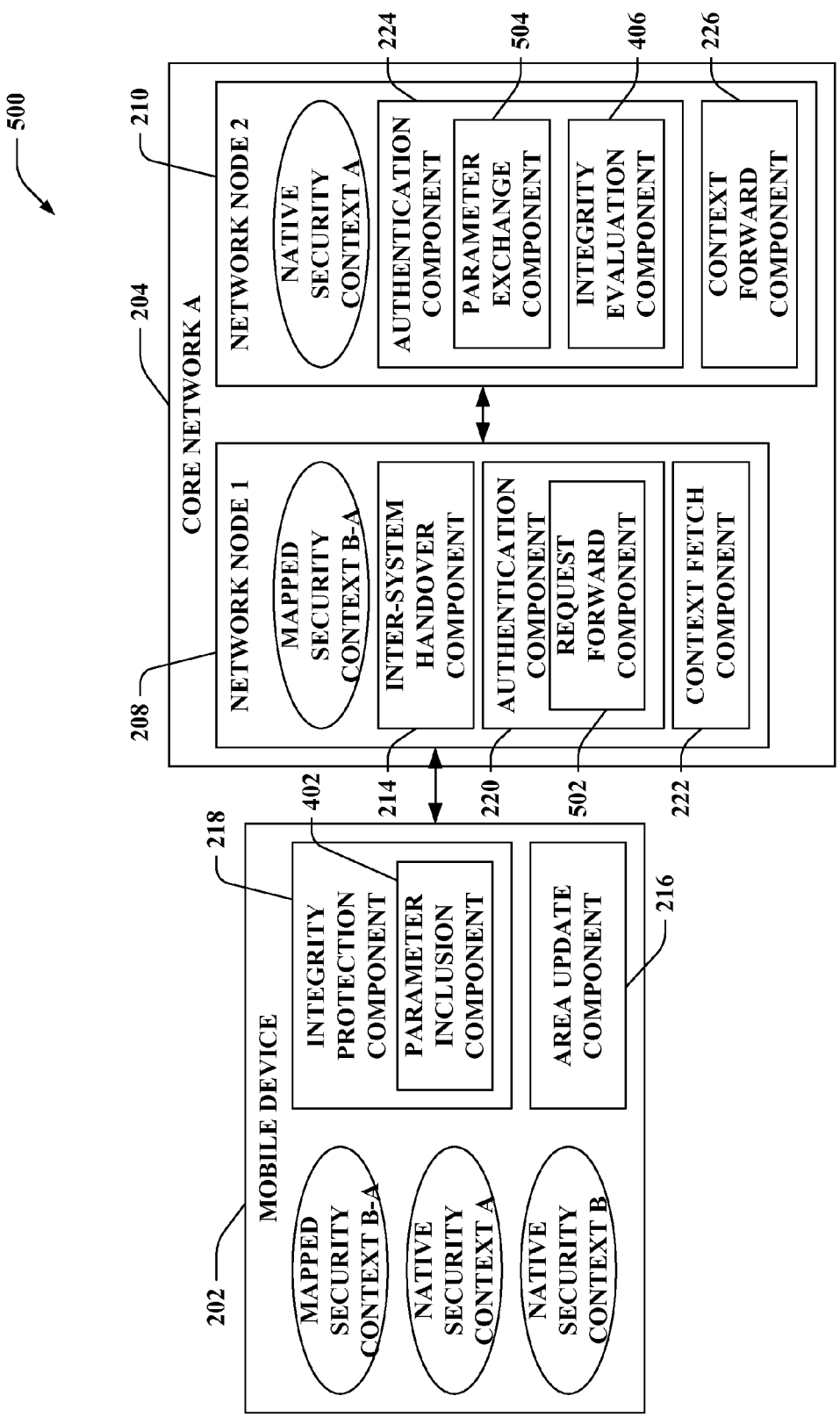
FIG. 5 is an illustration of an example system that utilizes additional parameters included in a mobility message for fetching a security context in a wireless communication environment.

Turning to FIG. 5, illustrated is another system 500 that utilizes additional parameters included in a mobility message for fetching a security context in a wireless communication environment. Similar to system 400 of FIG. 4, integrity protection component 218 of mobile device 202 can further include parameter inclusion component 402. Integrity parameter component 218 can employ the mapped security context B-A to integrity protect the mobility message. Parameter inclusion component 402 can yield the additional parameters (e.g., the disparate NAS MAC and the disparate NAS uplink counter based upon the native security context A, . . . ), which can be incorporated in optional IEs in the integrity protected mobility message. Thus, area update component 216 can transmit the integrity protected mobility message (e.g., yielded by integrity protection component 218 utilizing the mapped security context B-A, ... ) with the optional IEs that carry the disparate NAS MAC and the disparate NAS uplink counter associated with the native security context A.

Network node 1 208 can obtain the integrity protected mobility message with the optional IEs that carry the disparate NAS MAC and the disparate NAS uplink counter associated with the native security context A. Authentication component 220 can further include a request forward component 502. Request forward component 502 can cause context fetch component 222 to forward the integrity protected mobility message with the optional IEs that carry the disparate NAS MAC and the disparate NAS uplink counter to network node 2 210 for checking the integrity thereof.

Authentication component 224 of network node 2 210 can further include a parameter exchange component 504 and integrity evaluation component 406. Parameter exchange component 504 exchange parameters from the integrity protected mobility message with parameters carried by the optional IEs. For instance, parameter exchange component 504 can substitute the NAS MAC and the NAS uplink counter from the integrity protected mobility message corresponding to the mapped security context B-A (e.g., the NAS MAC yielded based upon a key from the mapped security context B-A, the NAS uplink counter associated with the mapped security context B-A, ... ) with the disparate NAS MAC and the disparate NAS uplink counter associated with the native security context A carried by the optional IEs to yield a modified integrity protected mobility message. Moreover, integrity evaluation component 406 can check an integrity of the modified integrity protected mobility message utilizing the native security context A. However, it is also contemplated that integrity evaluation component 406 can check the integrity of the obtained integrity protected mobility message with the optional IEs without rearranging such message. If the integrity check by integrity evaluation component 406 is successful, then context forward component 226 can send the native security context A to network node 1 208. Alternatively, if the integrity check by integrity evaluation component 406 is unsuccessful, then a failure can be reported to network node 1 208 and sending of the native security context A to network node 1 208 can be inhibited.

System 500 and system 400 of FIG. 4 differ as to which network node modifies the integrity protected mobility message. In system 400 of FIG. 4, network node 1 208 can exchange parameters (e.g., substitute NAS MACs and NAS uplink counters with parameter exchange component 404, ... ) and then send the modified integrity protected mobility message to network node 2 210 for the integrity check (e.g., with integrity evaluation component 406, ... ). In contrast, in system 500, network node 1 208 can transparently pass the integrity protected mobility message with the optional IEs that carry the additional parameters to network node 2 210 (e.g., utilizing request forward component 502, ... ), and network node 2 210 can substitute parameters (e.g., exchange NAS MACs and NAS uplink counters with parameter exchange component 504, ... ) and perform the integrity check (e.g., with integrity evaluation component 406, ... ).

Figure 6:
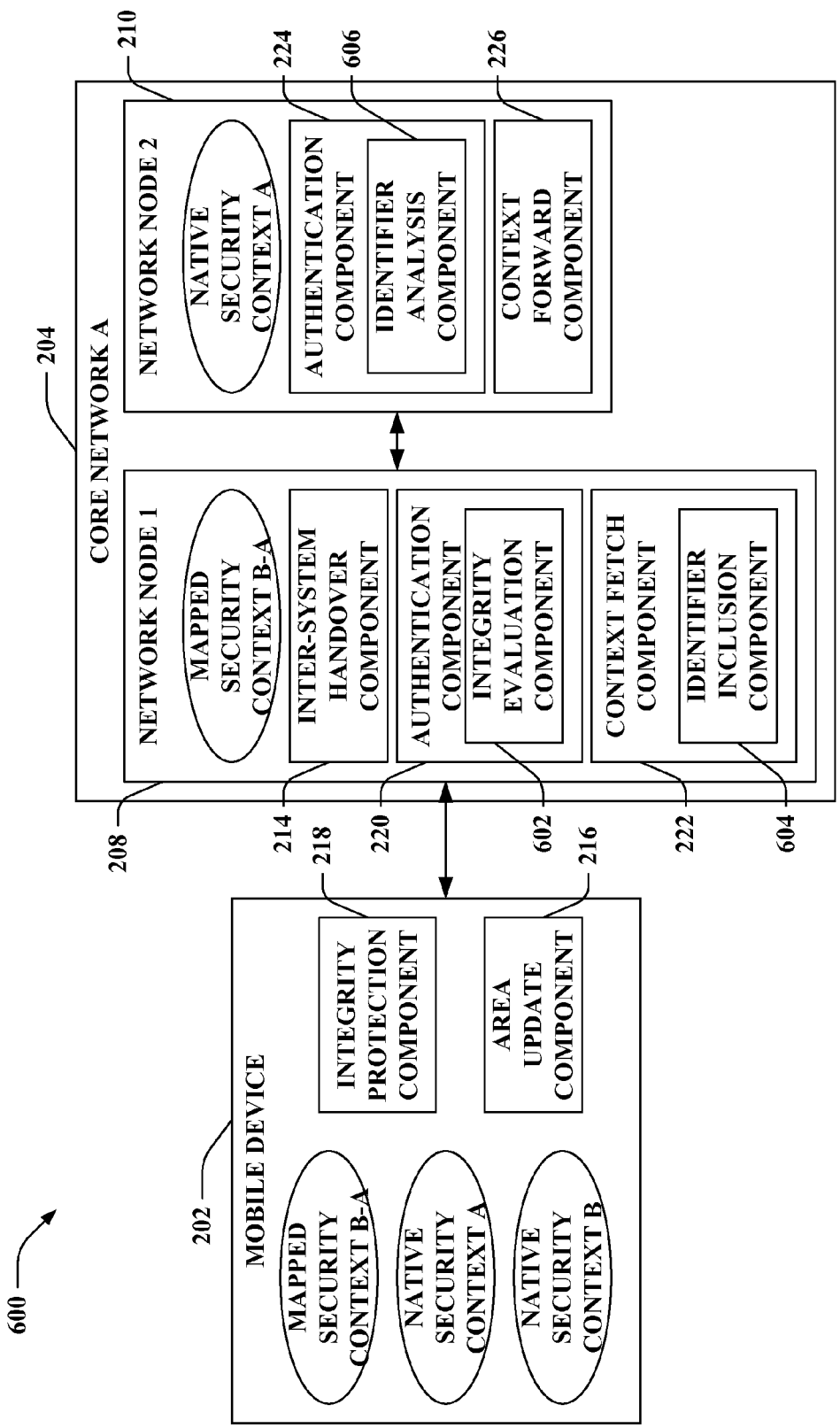
FIG. 6 is an illustration of an example system that enables a network node to perform an integrity check and fetch a security context in a wireless communication environment.

With reference to FIG. 6, illustrated is a system 600 that enables a network node to perform an integrity check and fetch a security context in a wireless communication environment. Integrity protection component 218 can utilize the mapped security context B-A to integrity protect the mobility message yielded by area update component 216. Further, the integrity protected mobility message can be sent (e.g., by area update component 216, ... ) from mobile device 202 to network node 1 208.

Network node 1 208 can receive the integrity protected mobility message from mobile device 202. Authentication component 220 can further include an integrity evaluation component 602 that can check an integrity of the integrity protected mobility message utilizing the mapped security context B-A. If the integrity check performed by integrity evaluation component 602 is successful, then context fetch component 222 can generate a context request message. Moreover, context fetch component 222 can include an identifier inclusion component 604 that can incorporate an identifier corresponding to mobile device 202 and an indication that mobile device 202 has been authenticated (e.g., by authentication component 220, integrity evaluation component 602, using the mapped security context B-A, the integrity check is successful, ... ) in the context request message. For instance, the identifier provided in the context request message by identifier inclusion component 604 can be an International Mobile Subscriber Identity (IMSI). Further, context fetch component 222 can send the context request message with the identifier and the indication that mobile device 202 has been authenticated to network node 2 210. Alternatively, sending of the context request message can be inhibited if the integrity check performed by integrity evaluation component 602 is unsuccessful.

Authentication component 224 of network node 2 210 can further include an identifier analysis component 606 that can evaluate the context request message received from network node 1 208. For instance, identifier analysis component 606 can recognize the identity of mobile device 202 based upon the identifier included in the context request message. Further, identifier analysis component 606 can detect that mobile device 202 has been successfully authenticated by network node 1 208. Further, context forward component 226 can send the native security context A for mobile device 202 to network node 1 208 in response to the context request message. Context forward component 226 can transmit the native security context A as part of a context response message.

Figure 7:
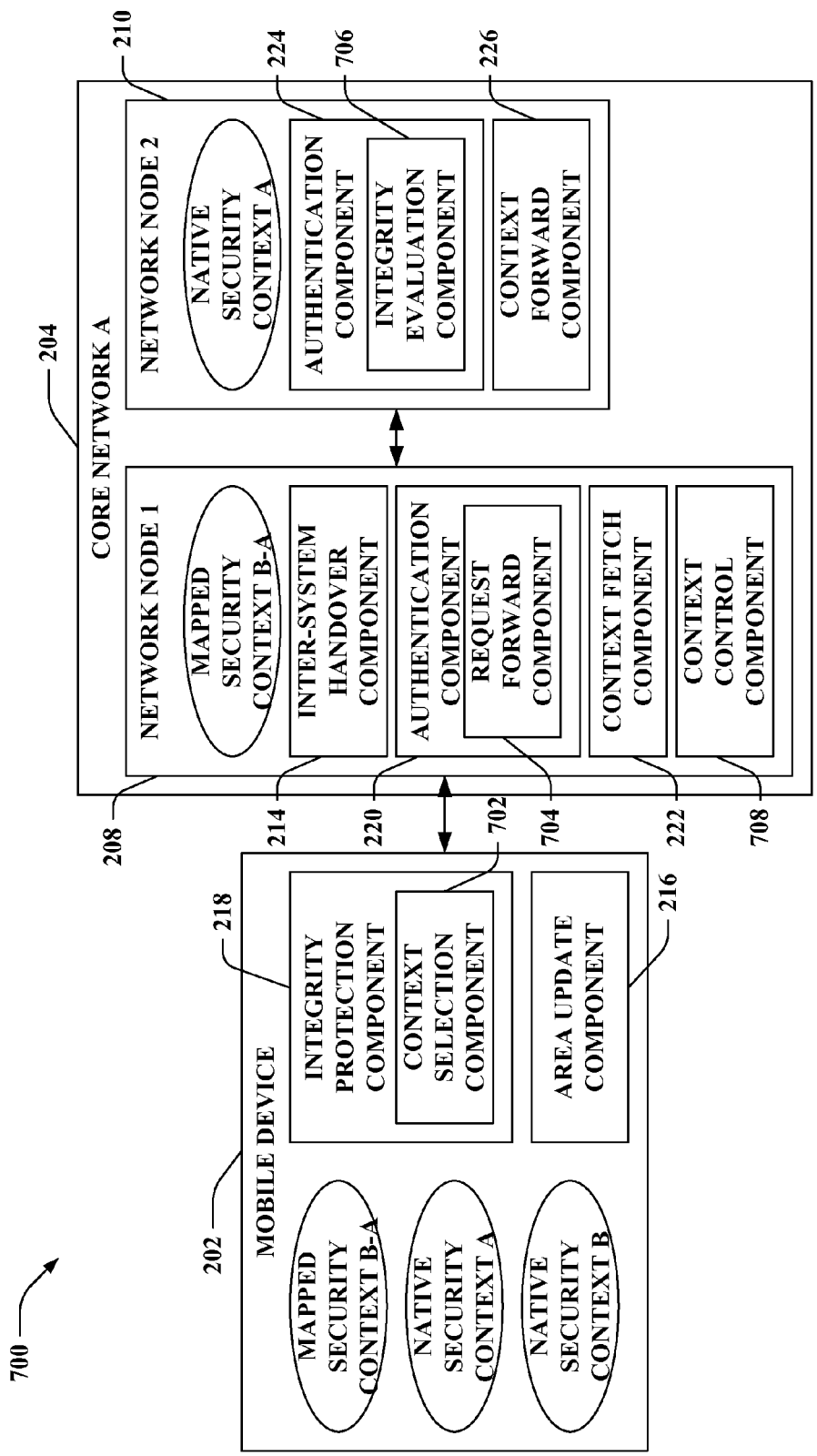
FIG. 7 is an illustration of an example system that utilizes a cached native security context to protect a mobility message after inter-system handover in a wireless communication environment.

Now turning to FIG. 7, illustrated is a system 700 that utilizes a cached native security context to protect a mobility message after inter-system handover in a wireless communication environment. Integrity protection component 218 can further include a context selection component 702 that can choose a security context to leverage for protecting the mobility message yielded by area update component 216. More particularly, after handover, context selection component 702 can select to utilize a cached native security context A (e.g., a cached native EPS security context, ... ) to integrity protect the mobility message when mobile device 202 has the cached native security context A rather than utilizing the mapped security context B-A derived during handover. For example, mobile device 202 can temporarily have both mapped and native EPS security context activated, but can use the native EPS security context for the mobility message protection (e.g., TAU request message protection, ... ). The integrity protected mobility message (e.g., integrity protected utilizing the native security context A, ... ) can further be transmitted (e.g., by area update component 216, ... ) from mobile device 202 to network node 1 208.

Network node 1 208 can receive the integrity protected mobility message from mobile device 202. Authentication component 220 can include a request forward component 704 that can cause context fetch component 222 to forward the integrity protected mobility message to network node 2 210.

Authentication component 224 of network node 2 210 can further include an integrity evaluation component 706, which can check the integrity of the integrity protected mobility message utilizing the native security context A. If the integrity of the message is successfully verified by integrity evaluation component 706, then context forward component 226 can send the native security context A to network node 1 208 as part of a context response message; otherwise, if the integrity of the message is not successfully verified by integrity evaluation component 706, then a failure can be reported to network node 1 208 as part of the context response message.

Further, network node 1 208 can include a context control component 708 that can manage a security context utilized by mobile device 202 (e.g., as chosen by context selection component 702, . . . ) for subsequent messages. Context control component 708 can send a message to mobile device 202 indicating which security context (e.g., the native security context A, the mapped security context B-A, . . . ) to utilize for subsequent messages (e.g., subsequent NAS messages, . . . ) based upon the context response message received from network node 2 210. For example, context control component 708 and context selection component 702 can effectuate a Non-Access Stratum (NAS) Security Mode Command (SMC) procedure to change or maintain the security context leveraged by mobile device 202 for the subsequent messages.

Figure 8:
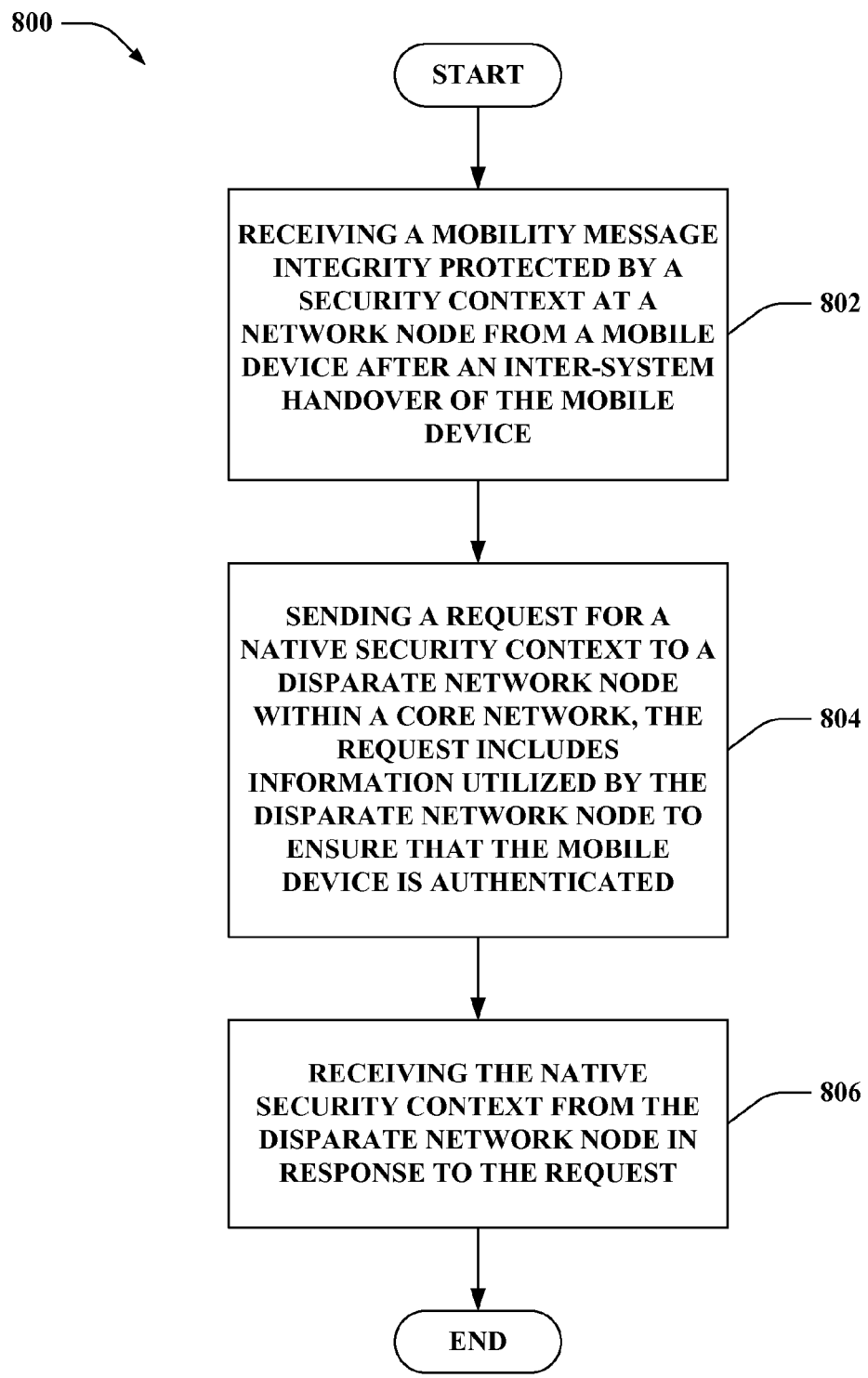
FIG. 8 is an illustration of an example methodology that facilitates obtaining a native security context from a disparate network node in a wireless communication environment.
Figure 9:
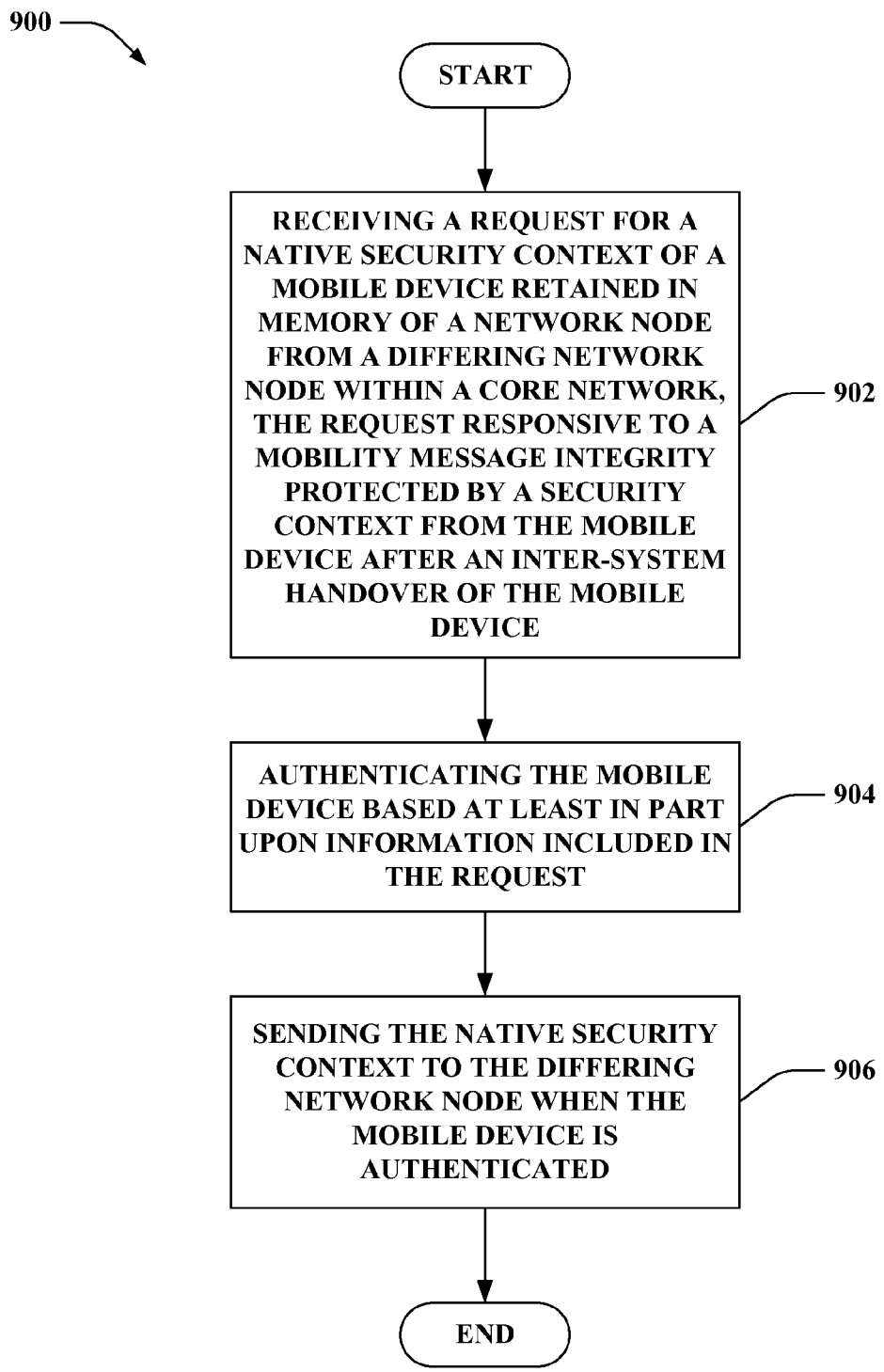
FIG. 9 is an illustration of an example methodology that facilitates forwarding a native security to a disparate network node in a wireless communication environment.
Figure 10:
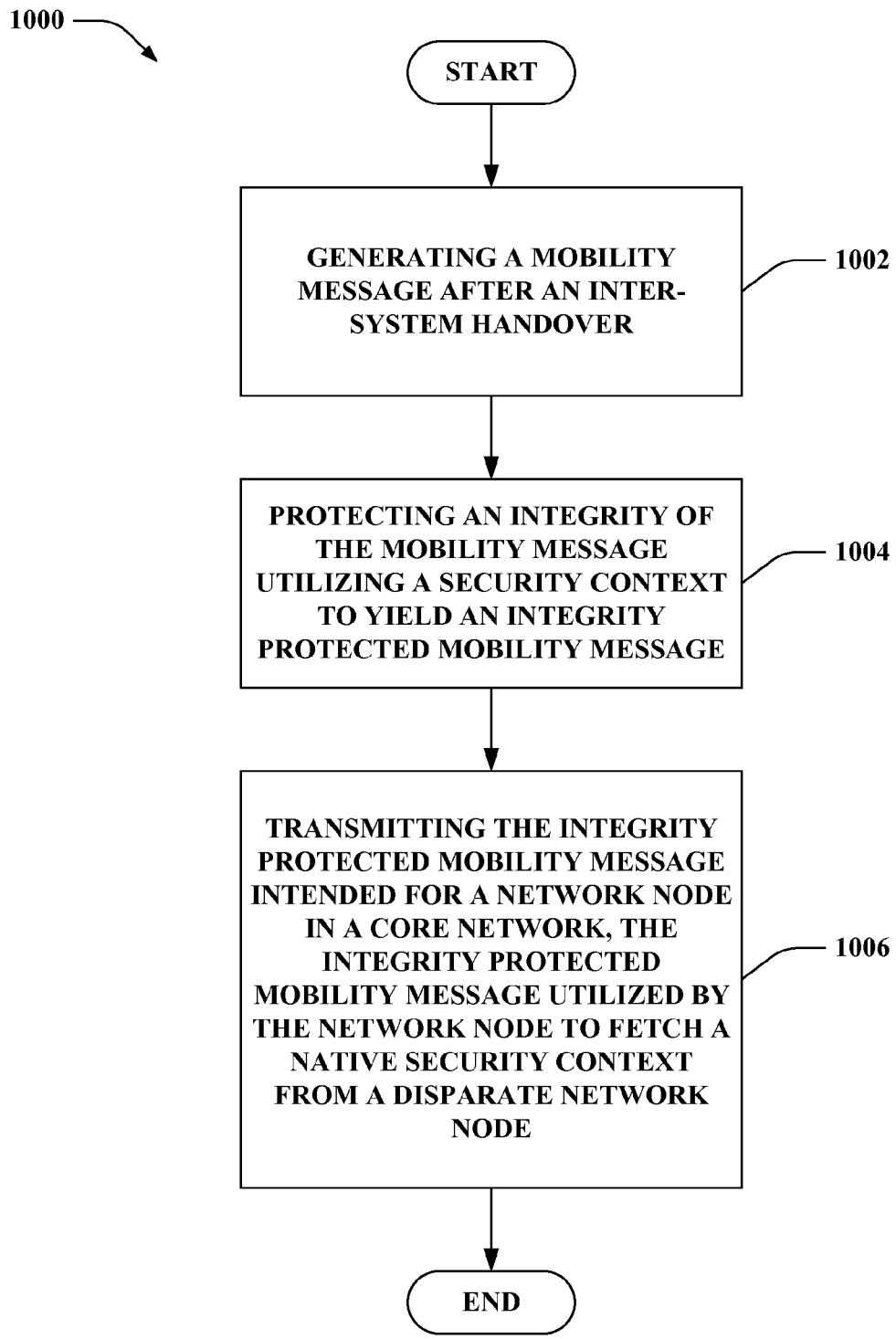
FIG. 10 is an illustration of an example methodology that facilitates sending a mobility message after an inter-system handover in a wireless communication environment.

Referring to FIGS. 8-10, methodologies relating to fetching a native security context between network nodes after an inter-system handover in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 8, illustrated is a methodology 800 that facilitates obtaining a native security context from a disparate network node in a wireless communication environment. At 802, a mobility message integrity protected by a security context can be received at a network node from a mobile device after an inter-system handover of the mobile device. The mobility message, for instance, can be a Tracking Area Update request message (TAU request message); however, the claimed subject matter is not so limited. Moreover, the network node can be a Mobility Management Entity (MME); yet, it is to be appreciated that the claimed subject matter is not so limited.

The mobility message can be integrity protected by a mapped security context derived from a differing native security context of a differing type of system (e.g., as compared to a type of system associated with the network node, . . . ) during the inter-system handover. For example, the mapped security context can be a mapped Evolved Packet System (EPS) security context derived from a native General Packet Radio Service (GPRS) security context utilized by the mobile device in a UMTS Terrestrial Radio Access Network (UTRAN) system or a GSM Enhanced Data rates for GSM Evolution (EDGE) Radio Access Network (GERAN) system prior to handover to an Evolved UMTS Terrestrial Radio Access Network (E-UTRAN) system. Moreover, the mobility message can be integrity protected by a native security context of a type of system associated with the network node, while the network node can lack the native security context when the mobility message is received. Thus, for example, the mobility message can be integrity protected by a native EPS security context, yet the network node can lack the native EPS security context for the mobile device when the mobility message is received.

At 804, a request for a native security context can be sent to a disparate network node within a core network. The request can include information utilized by the disparate network node to ensure that the mobile device is authenticated. The disparate network node can be an MME and/or the core network can be an Evolved Packet System core network (EPS core network), for example; however, the claimed subject matter is not so limited. Further, the mobile device could have previously registered with the disparate network node to yield the native security context. Moreover, the native security context can be retained by the disparate network node when the mobile device moves to a disparate type of system (e.g., a UTRAN/GERAN system, . . . ). The native security context can be more secure than a mapped security context derived from a differing native security context of a differing type of system. Similarly, the native security context can be more secure than the differing native security context of the differing type of system. At 806, the native security context can be received from the disparate network node in response to the request.

According to an example, the mobility message can be integrity protected (e.g., by the mobile device, . . . ) utilizing the mapped security context (e.g., the mapped EPS security context, derived from a differing native security context of a differing type of system, . . . ); thus, the mobility message can include a Non-Access Stratum (NAS) Message Authentication Code (MAC) and a NAS uplink counter associated with the mapped security context. Moreover, the mobility message can include optional information elements (IEs) that carry additional parameters generated based upon the native security context. The additional parameters can include a differing NAS MAC and a differing NAS uplink counter associated with the native security context. Further, parameters of the mobility message associated with the mapped security context can be replaced with the additional parameters associated with the native security context carried by the optional IEs to yield a modified mobility message. By way of illustration, the NAS MAC and the NAS uplink counter from the mobility message associated with the mapped security context can be replaced by the differing NAS MAC and the differing NAS uplink counter associated with the native security context carried by the optional IEs to yield the modified mobility message. Moreover, the request for the native security context can include the modified mobility message, which can be integrity checked by the disparate network node utilizing the native security context to authenticate the mobile device.

By way of another example, the mobility message can be integrity protected (e.g., by the mobile device, . . . ) employing the mapped security context (e.g., the mapped EPS security context, derived from a differing native security context of a differing type of system, . . . ); thus, the mobility message can include a NAS MAC and a NAS uplink counter associated with the mapped security context. Moreover, the mobility message can include optional IEs that carry additional parameters generated based upon the native security context. The additional parameters can include a differing NAS MAC and a differing NAS uplink counter associated with the native security context. Further, the mobility message integrity protected by the mapped security context that includes the optional IEs that carry the additional parameters (e.g., the differing NAS MAC and the differing NAS uplink counter associated with the native security context, . . . ) can be forwarded to the disparate network node. Thus, the request for the native security context can include the mobility message integrity protected by the mapped security context that includes the optional IEs that carry the additional parameters. Accordingly, the disparate network node can substitute parameters of the mobility message associated with the mapped security context with the additional parameters associated with the native security context carried by the optional IEs to yield a modified mobility message, which can be integrity checked by the disparate network node utilizing the native security context to authenticate the mobile device. Alternatively, it is contemplated that the disparate network node need not reorganize the mobility message integrity protected by the mapped security context that includes the optional IEs that carry the additional parameters to check the integrity.

Pursuant to another example, the mobility message can be integrity protected (e.g., by the mobile device, . . . ) utilizing the mapped security context (e.g., the mapped EPS security context, derived from a differing native security context of a differing type of system, . . . ). Further, an integrity check of the mobility message can be performed at the network node employing a mapped security context retained by the network node (e.g., derived during the inter-system handover, . . . ). If the integrity check is successful, then the request can be generated. The request can be a context request message that can include an identifier corresponding to the mobile device and an indication that the mobile device has been successfully authenticated by the network node. For example, the identifier corresponding to the mobile device can be an International Mobile Subscriber Identity (IMSI). Moreover, the context request message can be sent to the disparate network node, which can recognize the identity of the mobile device based upon the identifier and can detect that the mobile device has been successfully authenticated by the network node. Alternatively, if the integrity check is unsuccessful, then sending of the request can be inhibited.

By way of another example, the mobility message can be integrity protected (e.g., by the mobile device, . . . ) utilizing the native security context. Thus, the mobility message integrity protected utilizing the native security context can be sent to the disparate network node as part of the request. Hence, the mobility message can be integrity checked by the disparate network node utilizing the native security context to authenticate the mobile device. Further, a NAS Security Mode Command (SMC) procedure can be implemented to control (e.g., change or maintain, . . . ) the security context utilized by the mobile device for a subsequent message (e.g., subsequent NAS message, . . . ).

With reference to FIG. 9, illustrated is a methodology 900 that facilitates forwarding a native security to a disparate network node in a wireless communication environment. At 902, a request for a native security context of a mobile device retained in memory of a network node can be received from a differing network node within a core network. The request can be responsive to a mobility message integrity protected by a security context from the mobile device after an inter-system handover of the mobile device. For instance, the network node and the differing network node can be Mobility Management Entities (MMES); however, the claimed subject matter is not so limited. Further, the mobility message, for instance, can be a Tracking Area Update (TAU) request message; yet, it is contemplated that the claimed subject matter is not so limited. Moreover, the core network can be an Evolved Packet System (EPS) core network, although, the hereto appended claims are not so limited.

The mobility message can be integrity protected by a mapped security context derived from a differing native security context of a differing type of system (e.g., as compared to a type of system associated with the network node, . . . ) during the inter-system handover. For example, the mapped security context can be a mapped EPS security context derived from a native General Packet Radio Service (GPRS) security context utilized by the mobile device in a UMTS Terrestrial Radio Access Network (UTRAN) system or a GSM Enhanced Data rates for GSM Evolution (EDGE) Radio Access Network (GERAN) system prior to handover to an Evolved UMTS Terrestrial Radio Access Network (E-UTRAN) system. Moreover, the mobility message can be integrity protected by a native security context of a type of system associated with the network node, while the differing network node can lack the native security context when the mobility message is received from the mobile device. Thus, for example, the mobility message can be integrity protected by a native EPS security context, yet the differing network node can lack the native EPS security context for the mobile device when the mobility message is received from the mobile device.

At 904, the mobile device can be authenticated based at least in part upon information included in the request. At 906, the native security context can be sent to the differing network node when the mobile device is authenticated. Alternatively, when the mobile device is unsuccessfully authenticated, then a failure can be reported to the differing network node and sending of the native security context can be inhibited.

For example, the request can include a modified mobility message, where parameters (e.g., a Non-Access Stratum (NAS) Message Authentication Code (MAC) and a NAS uplink counter, . . . ) of the mobility message associated with a mapped security context (e.g., utilized to integrity protect the mobility message, . . . ) are replaced with additional parameters associated with the native security context carried in optional information elements (IEs). Accordingly, the mobile device can be authenticated by checking an integrity of the modified mobility message using the native security context. If checking the integrity of the modified mobility message is successful, then the native security context can be sent to the differing network node. If checking the integrity of the modified mobility message is unsuccessful, then a failure can be reported to the differing network node and sending of the native security context can be inhibited.

According to another example, the request can include the mobility message integrity protected (e.g., by the mobile device, . . . ) utilizing the mapped security context that includes optional IEs that carry additional parameters (e.g., a differing NAS MAC and a differing NAS uplink counter associated with the native security context, . . . ). Further, parameters of the mobility message associated with the mapped security context can be replaced with the additional parameters associated with the native security context carried by the optional IEs to yield a modified mobility message. Moreover, the mobile device can be authenticated by checking an integrity of the modified mobility message using the native security context. If checking the integrity of the modified mobility message is successful, then the native security context can be sent to the differing network node. If checking the integrity of the modified mobility message is unsuccessful, then a failure can be reported to the differing network node and sending of the native security context can be inhibited. Alternatively, it is contemplated that the mobility message integrity protected by the mapped security context that includes the optional IEs that carry the additional parameters need not be reorganized to check the integrity.

By way of another example, the request can be a context request message that can include an identifier corresponding to the mobile device and an indication that the mobile device has been authenticated by the differing network node. For example, the identifier corresponding to the mobile device can be an International Mobile Subscriber Identity (IMSI). Thus, the mobile device can be authenticated by recognizing the identity of the mobile device based upon the identifier and detecting that the mobile device has been authenticated by the differing network node based upon the indication.

Pursuant to a further example, the request can include the mobility message integrity protected (e.g., by the mobile device, . . . ) utilizing the native security context. Accordingly, the mobile device can be authenticated by checking an integrity of the mobility message using the native security context. If checking the integrity of the mobility message is successful, then the native security context can be sent to the differing network node. If checking the integrity of the mobility message is unsuccessful, then a failure can be reported to the differing network node and sending of the native security context can be inhibited.

Now turning to FIG. 10, illustrated is a methodology 1000 that facilitates sending a mobility message after an inter-system handover in a wireless communication environment. At 1002, a mobility message can be generated after an inter-system handover. For instance, the inter-system handover can be from a UMTS Terrestrial Radio Access Network (UTRAN) system or a GSM Enhanced Data rates for GSM Evolution (EDGE) Radio Access Network (GERAN) system to an Evolved UMTS Terrestrial Radio Access Network (E-UTRAN) system. Moreover, the mobility message can be a Tracking Area Update (TAU) request message; yet, it is contemplated that the claimed subject matter is not so limited.

At 1004, an integrity of the mobility message can be protected utilizing a security context to yield an integrity protected mobility message. The integrity of the mobility message can be protected by a mapped security context derived from a native security context of a type of system from which a mobile device is handing over. For example, the mapped security context can be a mapped Evolved Packet System (EPS) security context derived from a native General Packet Radio Service (GPRS) security context utilized in a UTRAN system or a GERAN system prior to handover to an E-UTRAN system. Moreover, the mobility message can be integrity protected by a native security context of a type of system to which the mobile device hands over. Thus, for example, the mobility message can be integrity protected by a native EPS security context.

At 1006, the integrity protected mobility message can be transmitted intended for a network node in a core network. The integrity protected mobility message can be utilized by the network node to fetch a native security context from a disparate network node.

According to an example, the integrity of the mobility message can be protected utilizing the mapped security context (e.g., the mapped EPS security context, derived from a differing native security context of a differing type of system, . . . ); thus, the mobility message can include a Non-Access Stratum (NAS) Message Authentication Code (MAC) and a NAS uplink counter associated with the mapped security context. Moreover, additional parameters can be generated based upon the native security context, and the additional parameters can be carried in optional information elements (IEs) of the integrity protected mobility message. The additional parameters can include a differing NAS MAC and a differing NAS uplink counter associated with the native security context.

By way of another example, the integrity of the mobility message can be protected utilizing the native security context. Moreover, the security context to be utilized for a subsequent message (e.g., subsequent NAS message, . . . ) can be controlled by the network node by implementing a NAS Security Mode Command (SMC) procedure.

It will be appreciated that, in accordance with one or more aspects described herein, inferences can be made in connection with fetching a native security context between network nodes in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
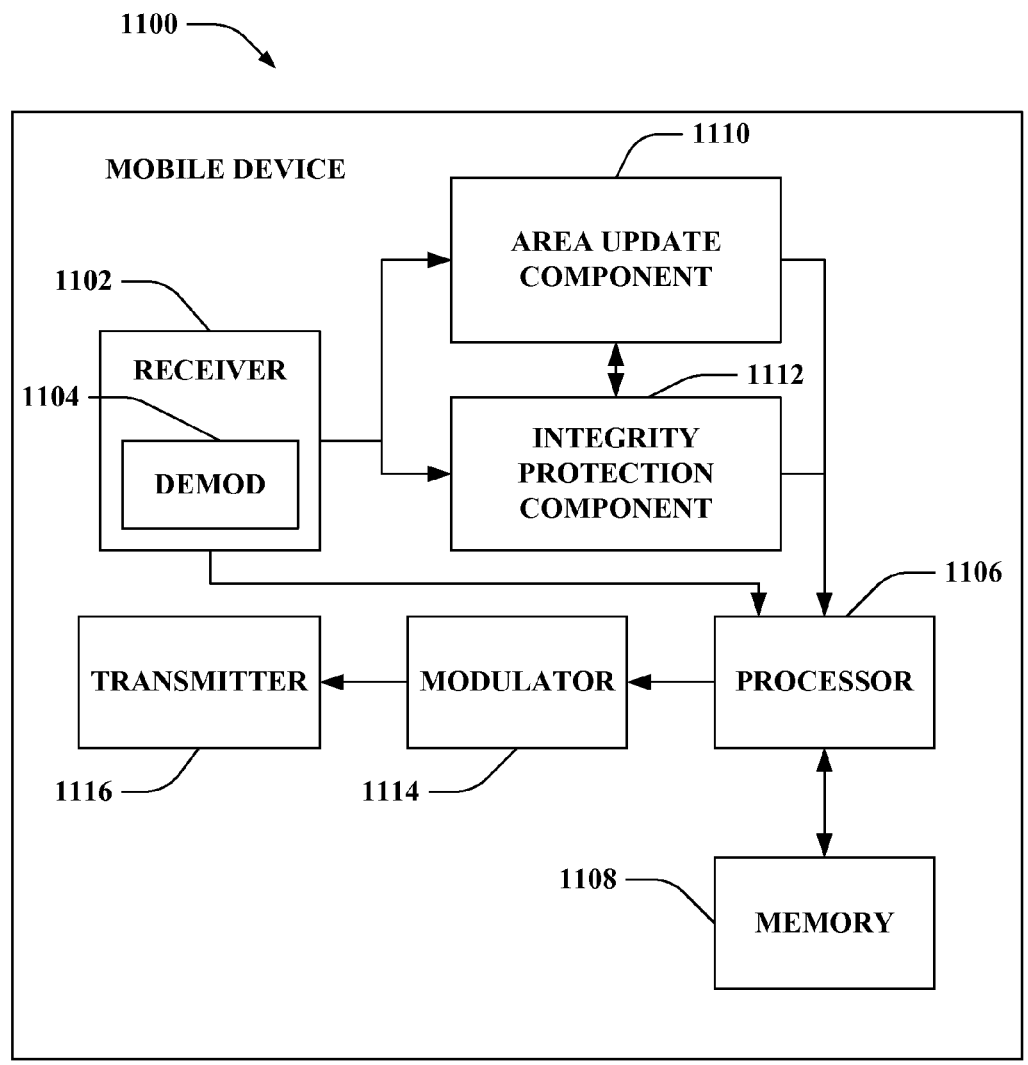
FIG. 11 is an illustration of an example mobile device that sends a mobility message in a wireless communication system.

FIG. 11 is an illustration of a mobile device 1100 that sends a mobility message in a wireless communication system. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, and any other suitable information related to performing the various actions and functions set forth herein. Memory 1108, for instance, can store protocols and/or algorithms associated with generating a mobility message, integrity protecting a mobility message, and so forth. Moreover, memory 1108 can include one or more security contexts associated with mobile device 1108.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1106 can be operatively coupled to an area update component 1110 and/or an integrity protection component 1112. Area update component 1110 can be substantially similar to area update component 216 of FIG. 2 and/or integrity protection component 1112 can be substantially similar to integrity protection component 218 of FIG. 2. Area update component 1110 can generate a mobility message after an inter-system handover. Moreover, integrity protection component 1112 can protect an integrity of the mobility message using a security context to yield an integrity protected mobility message. Thereafter, the integrity protected mobility message can be transmitted (e.g., by transmitter 1116, area update component 1110, . . . ) to a network node in a core network (e.g., via a base station, . . . ). Moreover, although not shown, it is contemplated that mobile device 1100 can further include a parameter inclusion component (e.g., substantially similar to parameter inclusion component 402 of FIG. 4, . . . ) and/or a context selection component (e.g., substantially similar to context selection component 702 of FIG. 7, . . . ). Mobile device 1100 still further comprises a modulator 1114 and a transmitter 1116 that transmits data, signals, etc. to a base station. Although depicted as being separate from the processor 1106, it is to be appreciated that area update component 1110, integrity protection component 1112 and/or modulator 1114 can be part of processor 1106 or a number of processors (not shown).

Figure 12:
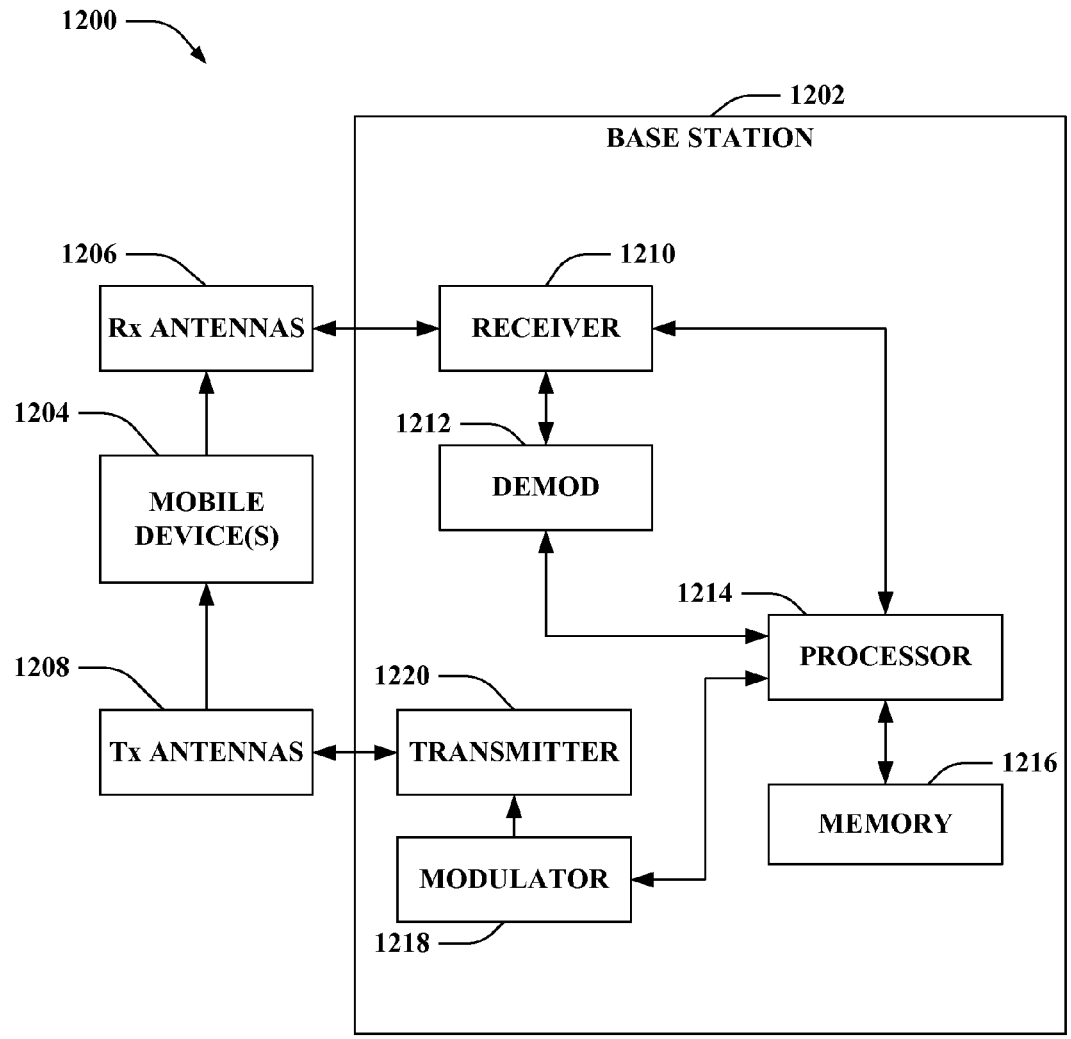
FIG. 12 is an illustration of an example system that operates in a wireless communication environment.

FIG. 12 is an illustration of a system 1200 that operates in a wireless communication environment. System 1200 comprises a base station 1202 (e.g., access point, . . . ) with a receiver 1210 that receives signal(s) from one or more mobile devices 1204 through a plurality of receive antennas 1206, and a transmitter 1220 that transmits to the one or more mobile devices 1204 through a transmit antenna 1208. Moreover, base station 1202 can receive signal(s) with receiver 1210 from one or more disparate base stations through the plurality of receive antennas 1206 and/or transmit to one or more disparate base stations with transmitter 1220 through the transmit antenna 1208. According to another illustration, base station 1202 can receive signal(s) from (e.g., with receiver 1210, . . . ) and/or transmit signal(s) to (e.g., with transmitter 1220, . . . ) one or more disparate base stations via a backhaul. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores data to be transmitted to or received from mobile device(s) 1204 and/or disparate base station(s) and/or any other suitable information related to performing the various actions and functions set forth herein. Base station 1202 can further include a modulator 1218. Modulator 1218 can multiplex a frame for transmission by a transmitter 1220 through antennas 1208 to mobile device(s) 1204 in accordance with the aforementioned description. Although depicted as being separate from the processor 1214, it is to be appreciated that modulator 1218 can be part of processor 1214 or a number of processors (not shown).

Figure 13:
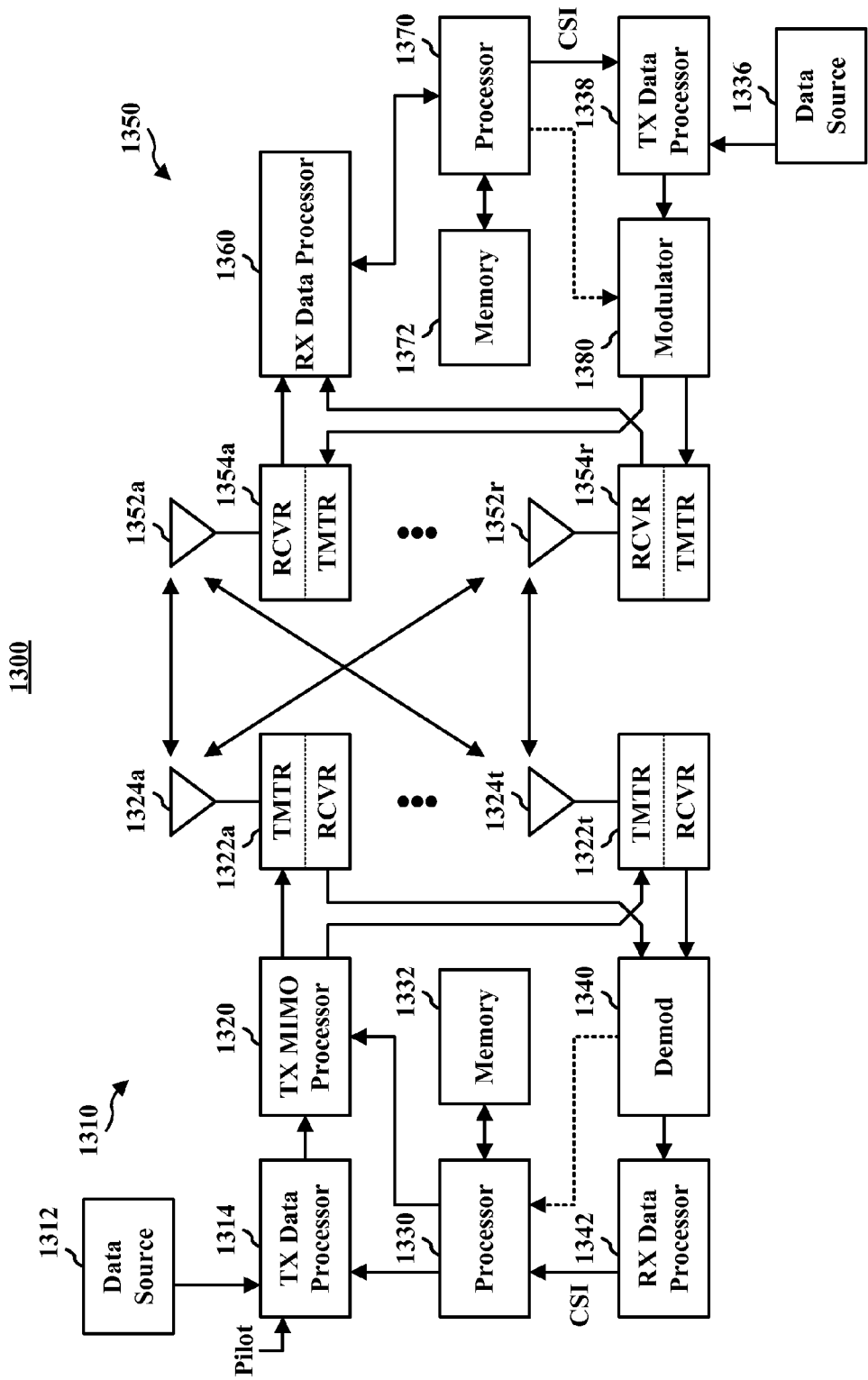
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-7, 11-12 and 14-16) and/or methods (FIGS. 8-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330. Memory 1332 can store program code, data, and other information used by processor 1330 or other components of base station 1310.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
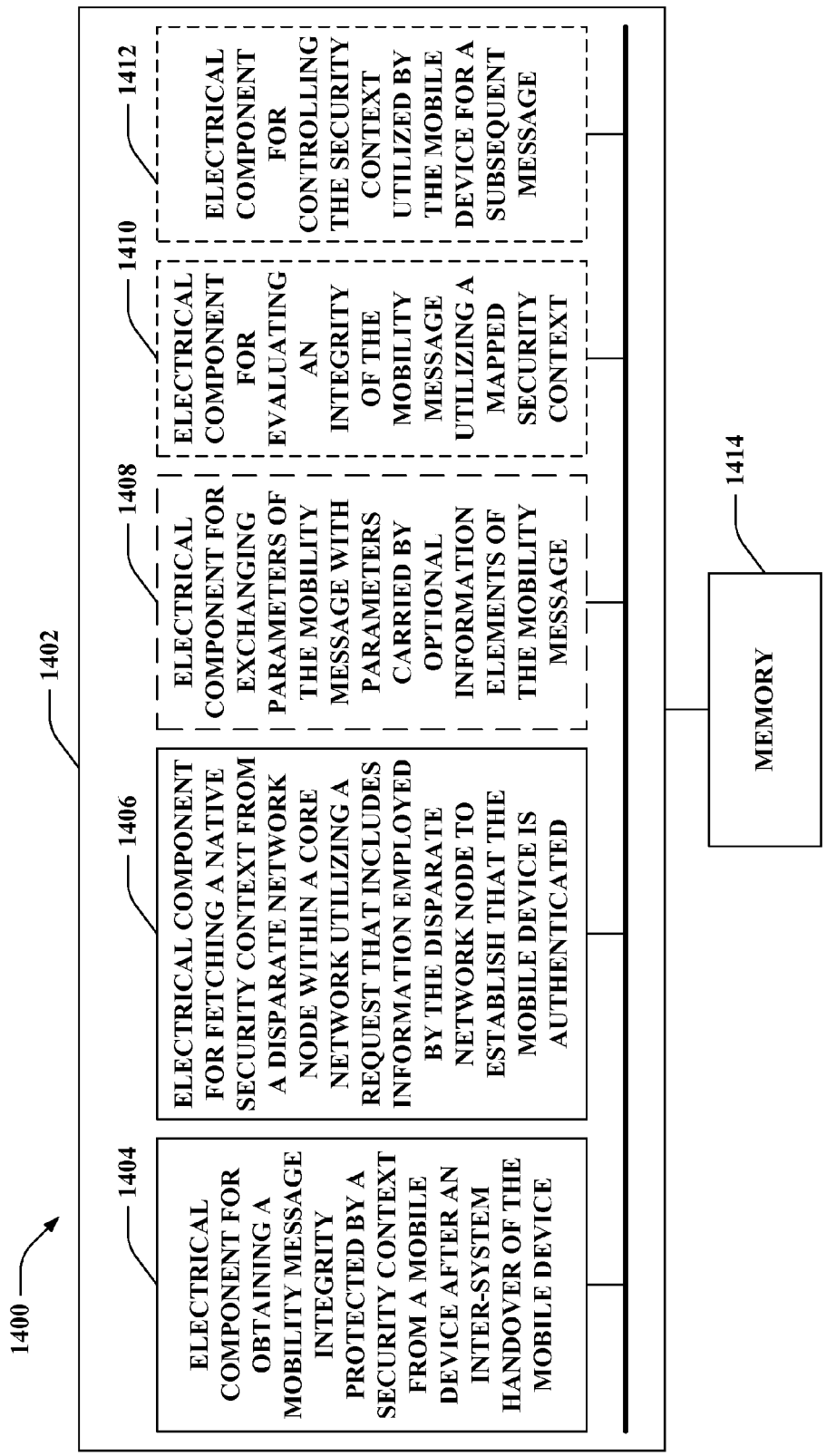
FIG. 14 is an illustration of an example system that enables collecting a native security context in a wireless communication environment.

With reference to FIG. 14, illustrated is a system 1400 that enables collecting a native security context in a wireless communication environment. For example, system 1400 can reside at least partially within a network node of a core network. For instance, the network node can be an MME and the core network can be an EPS core network; yet, the claimed subject matter is not so limited. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for obtaining a mobility message integrity protected by a security context from a mobile device after an inter-system handover of the mobile device 1404. Further, logical grouping 1402 can include an electrical component for fetching a native security context from a disparate network node within a core network utilizing a request that includes information employed by the disparate network node to establish that the mobile device is authenticated 1406. Logical grouping 1402 can also optionally include an electrical component for exchanging parameters of the mobility message with parameters carried by optional information elements (IEs) of the mobility message 1408. For instance, a NAS MAC and a NAS uplink counter can be exchanged. Moreover, logical grouping 1402 can optionally include an electrical component for evaluating an integrity of the mobility message utilizing a mapped security context 1410. By way of example, the mobility message can be integrity protected by the mobile device employing the mapped security context. Further, the request can include an identifier corresponding to the mobile device and an indication that the integrity of the mobility message has been successfully verified. Logical grouping 1402 can also optionally include an electrical component for controlling the security context utilized by the mobile device for a subsequent message 1412. Additionally, system 1400 can include a memory 1414 that retains instructions for executing functions associated with electrical components 1404, 1406, 1408, 1410, and 1412. While shown as being external to memory 1414, it is to be understood that one or more of electrical components 1404, 1406, 1408, 1410, and 1412 can exist within memory 1414.

Figure 15:
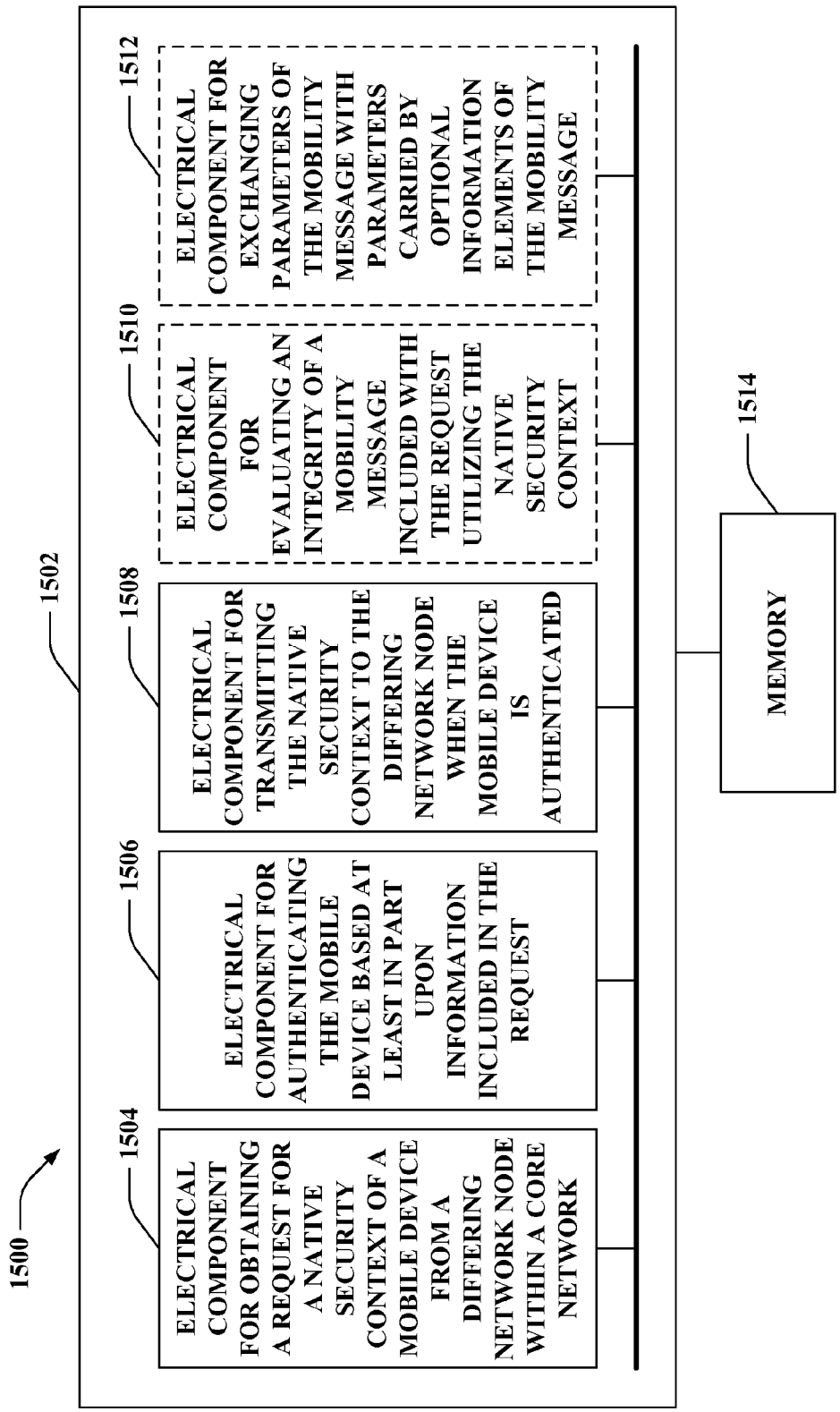
FIG. 15 is an illustration of an example system that enables providing a native security context in a wireless communication environment.

With reference to FIG. 15, illustrated is a system 1500 that enables providing a native security context in a wireless communication environment. For example, system 1500 can reside at least partially within a network node of a core network. For instance, the network node can be an MME and the core network can be an EPS core network; yet, the claimed subject matter is not so limited. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for obtaining a request for a native security context of a mobile device from a differing network node within a core network 1504. Further, logical grouping 1502 can include an electrical component for authenticating the mobile device based at least in part upon information included in the request 1506. Moreover, logical grouping 1502 can include an electrical component for transmitting the native security context to the differing network node when the mobile device is authenticated 1508. Logical grouping 1502 can also optionally include an electrical component for evaluating an integrity of a mobility message included with the request utilizing the native security context 1510. Additionally, logical grouping 1502 can optionally include an electrical component for exchanging parameters of the mobility message with parameters carried by optional information elements (IEs) of the mobility message 1512. Additionally, system 1500 can include a memory 1514 that retains instructions for executing functions associated with electrical components 1504, 1506, 1508, 1510, and 1512. While shown as being external to memory 1514, it is to be understood that one or more of electrical components 1504, 1506, 1508, 1510, and 1512 can exist within memory 1514.

Figure 16:
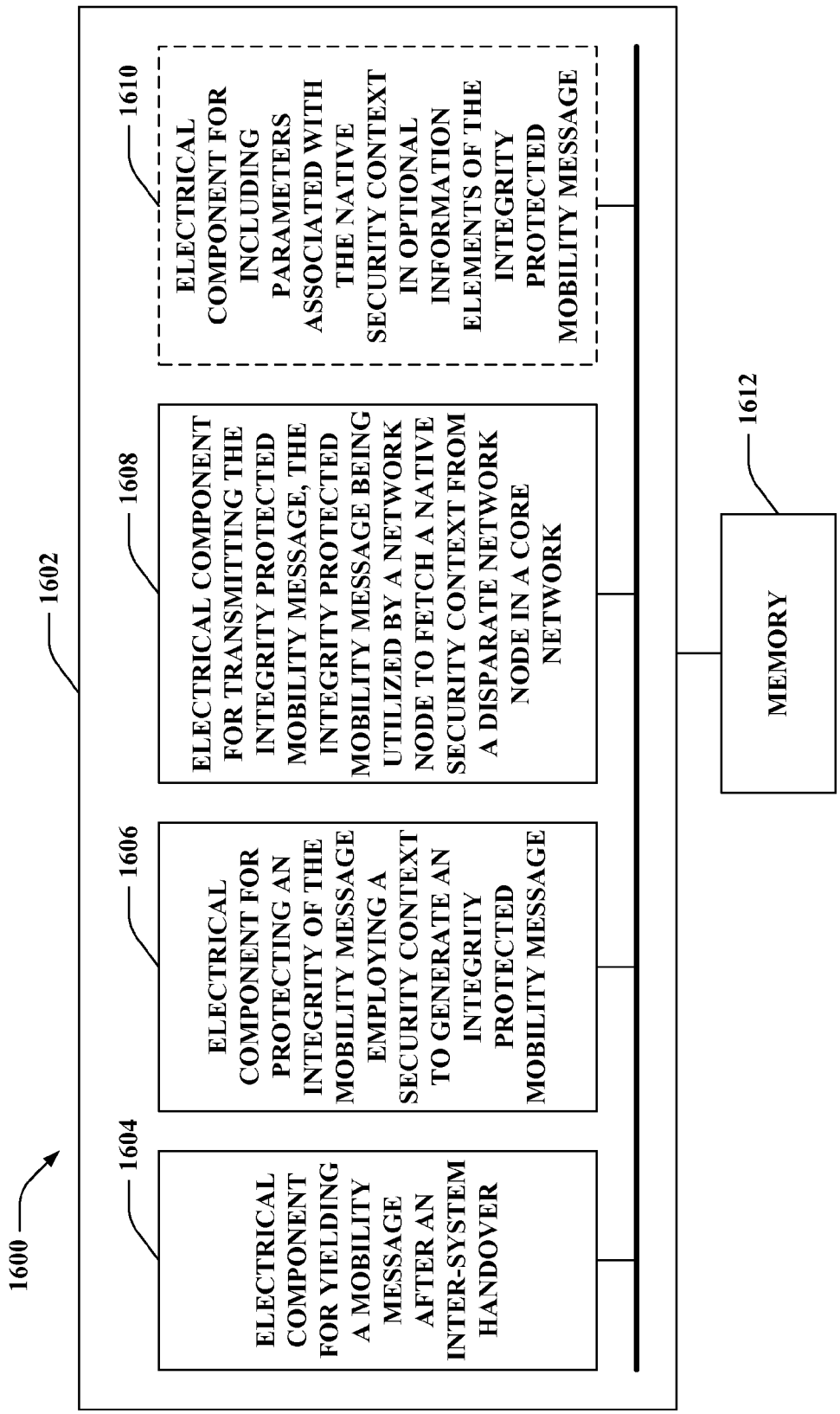
FIG. 16 is an illustration of an example system that enables yielding a mobility message in a wireless communication environment.

With reference to FIG. 16, illustrated is a system 1600 that enables yielding a mobility message in a wireless communication environment. For example, system 1600 can reside within a mobile device. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for yielding a mobility message after an inter-system handover 1604. Further, logical grouping 1602 can include an electrical component for protecting an integrity of the mobility message employing a security context to generate an integrity protected mobility message 1606. Moreover, logical grouping 1602 can include an electrical component for transmitting the integrity protected mobility message 1608. The integrity protected mobility message can be utilized by a network node to fetch a native security context from a disparate network node in a core network. Logical grouping 1602 can also optionally include an electrical component for including parameters associated with the native security context in optional information elements (IEs) of the integrity protected mobility message 1610. Additionally, system 1600 can include a memory 1612 that retains instructions for executing functions associated with electrical components 1604, 1606, 1608, and 1610. While shown as being external to memory 1612, it is to be understood that one or more of electrical components 1604, 1606, 1608, and 1610 can exist within memory 1612.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal In the alternative, the processor and the storage medium can reside as discrete components in a user terminal Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method to be performed at a network node, the method comprising:
   receiving, at the network node, a mobility message integrity protected by a security context from a mobile device after an inter-system handover of the mobile device;
   sending, by the network node, a request for a native security context to a disparate network node within a core network, wherein the request includes information utilized by the disparate network node to ensure that the mobile device is authenticated; and
   receiving, by the network node, the native security context from the disparate network node in response to the request.

2. The method of claim 1, wherein the mobility message is a tracking area update request message.

3. The method of claim 1, wherein the network node and the disparate network node are mobility management entities and the core network is an evolved packet system core network.

4. The method of claim 1, wherein the mobility message is integrity protected employing a mapped security context derived from a differing native security context of a differing type of system.

5. The method of claim 4, wherein the mobility message includes optional information elements that carry additional parameters generated based upon the native security context.

6. The method of claim 5, further comprising:
replacing parameters of the mobility message associated with the mapped security context with the additional parameters associated with the native security context carried by the optional information elements to yield a modified mobility message; and
sending the modified mobility message to the disparate network node to perform an integrity check to authenticate the mobile device.

7. The method of claim 6, further comprising replacing a non-access stratum message authentication code and a non-access stratum uplink counter from the mobility message associated with the mapped security context with a differing non-access stratum message authentication code and a differing non-access stratum uplink counter associated with the native security context carried by the optional information elements to yield the modified mobility message.

8. The method of claim 5, further comprising forwarding the mobility message that includes the optional information elements that carry the additional parameters generated based upon the native security context to the disparate network node.

9. The method of claim 4, further comprising:
performing an integrity check of the mobility message at the network node employing a mapped security context derived during the inter-system handover and retained by the network node; and
generating the request for the native security context when the integrity check is successful, wherein the request is a context request message that includes an identifier corresponding to the mobile device and an indication that the mobile device has been successfully authenticated by the network node.

10. The method of claim 9, wherein the identifier corresponding to the mobile device is an international mobile subscriber identity.

11. The method of claim 1, further comprising sending the mobility message to the disparate network node to be integrity checked by the disparate network node to authenticate the mobile device, wherein the mobility message is integrity protected utilizing the native security context.

12. The method of claim 11, further comprising controlling the security context utilized by the mobile device for a subsequent message by implementing a non-access stratum security mode command procedure.

13. A wireless communications apparatus, comprising:
at least one processor of a network node of a core network, the at least one processor configured to:
obtain a mobility message integrity protected by a security context from a mobile device after an inter-system handover of the mobile device;
transmit a request for a native security context to a disparate network node of the core network, wherein the request includes information utilized by the disparate network node to verify that the mobile device is authenticated; and
obtain the native security context from the disparate network node in response to the request.

14. The wireless communications apparatus of claim 13, wherein the mobility message is integrity protected employing a mapped security context derived from a differing native security context of a differing type of system.

15. The wireless communications apparatus of claim 14, wherein the mobility message includes optional information elements that carry additional parameters generated based upon the native security context.

16. The wireless communications apparatus of claim 15, further comprising:
at least one processor configured to:
exchange parameters of the mobility message associated with the mapped security context with the additional parameters associated with the native security context carried by the optional information elements to yield a modified mobility message; and
transmit the modified mobility message to the disparate network node to perform an integrity check to authenticate the mobile device.

17. The wireless communications apparatus of claim 15, further comprising: at least one processor configured to: transmit the mobility message that includes the optional information elements that carry the additional parameters generated based upon the native security context to the disparate network node.

18. The wireless communications apparatus of claim 14, further comprising:
at least one processor configured to:
perform an integrity check of the mobility message at the network node employing a mapped security context derived during the inter-system handover and retained by the network node; and
generate the request for the native security context when the integrity check is successful, wherein the request is a context request message that includes an identifier corresponding to the mobile device and an indication that the mobile device has been successfully authenticated by the network node.

19. The wireless communications apparatus of claim 18, wherein the identifier corresponding to the mobile device is an international mobile subscriber identity.

20. The wireless communications apparatus of claim 13, further comprising:
at least one processor configured to:
transmit the mobility message to the disparate network node to be integrity checked by the disparate network node to authenticate the mobile device, wherein the mobility message is integrity protected utilizing the native security context.

21. An apparatus at a network node of a communication network, comprising:
means for obtaining a mobility message integrity protected by a security context from a mobile device after an inter-system handover of the mobile device; and
means for fetching a native security context from a disparate network node within a core network utilizing a request that includes information employed by the disparate network node to establish that the mobile device is authenticated.

22. The apparatus of claim 21, further comprising means for exchanging parameters of the mobility message with parameters carried by optional information elements of the mobility message.

23. The apparatus of claim 21, further comprising means for evaluating an integrity of the mobility message utilizing a mapped security context.

24. The apparatus of claim 23, wherein the mobility message is integrity protected by the mobile device employing the mapped security context.

25. The apparatus of claim 23, wherein the request includes an identifier corresponding to the mobile device and an indication that the integrity of the mobility message has been successfully verified.

26. The apparatus of claim 21, further comprising means for controlling the security context utilized by the mobile device for a subsequent message.

27. A computer program product, comprising:
a non-transitory computer-readable medium having stored thereon code comprising:
code for causing at least one computer of a network node of a communication network to receive a mobility message integrity protected by a security context from a mobile device after an inter-system handover of the mobile device; and
code for causing at least one computer of the network node of the communication network to fetch a native security context from a disparate network node within a core network utilizing a request that includes information employed by the disparate network node to establish that the mobile device is authenticated.

28. The computer program product of claim 27, wherein the computer-readable medium further includes code stored thereon comprising code for causing at least one computer of the network node of the communication network to replace parameters of the mobility message with parameters carried by optional information elements of the mobility message.

29. The computer program product of claim 27, wherein the computer-readable medium further includes code stored thereon comprising code for causing at least one computer of the network node of the communication network to check an integrity of the mobility message utilizing a mapped security context.

30. The computer program product of claim 29, wherein the request includes an identifier corresponding to the mobile device and an indication that the integrity of the mobility message has been successfully verified.

31. An apparatus at a network node of a communication network, comprising:
means for authenticating, for yielding information to be utilized by a disparate network node of a core network to verify that a mobile device is authenticated; and
means for fetching a context, for generating a request for a native security context from the disparate network node in response to a mobility message received from the mobile device, wherein the request includes the information to be utilized by the disparate network node to verify that the mobile device is authenticated.

32. The apparatus of claim 31, further comprising means for exchanging one or more parameters from the mobility message with one or more parameters carried by one or more optional information elements of the mobility message to yield a modified mobility message forwarded as at least part of the request.

33. The apparatus of claim 31, further comprising:
means for evaluating an integrity of the mobility message utilizing a mapped security context; and
means for including in the request an identifier corresponding to the mobile device and an indication that the mobile device has been authenticated.

34. A method, comprising:
receiving, at a network node, a request for a native security context of a mobile device retained in memory of the network node from a differing network node within a core network, the request responsive to a mobility message integrity protected by a security context from the mobile device after an inter-system handover of the mobile device;
authenticating, at the network node, the mobile device based at least in part upon information included in the request; and
sending, by the network node, the native security context to the differing network node when the mobile device is authenticated.

35. The method of claim 34, wherein the mobility message is a tracking area update request message.

36. The method of claim 34, wherein the network node and the differing network node are mobility management entities and the core network is an evolved packet system core network.

37. The method of claim 34, wherein the request includes a modified mobility message, wherein parameters of the mobility message associated with a mapped security context are replaced with additional parameters associated with the native security context carried in optional information elements.

38. The method of claim 37, further comprising authenticating the mobile device by checking an integrity of the modified mobility message using the native security context.

39. The method of claim 34, wherein the request includes the mobility message integrity protected utilizing a mapped security context and including optional information elements that carry additional parameters associated with the native security context.

40. The method of claim 39, further comprising:
replacing parameters of the mobility message associated with the mapped security context with the additional parameters associated with the native security context carried by the optional information elements to yield a modified mobility message; and
authenticating the mobile device by checking an integrity of the modified mobility message using the native security context.

41. The method of claim 40, wherein the additional parameters include a non-access stratum message authentication code and a non-access stratum uplink counter based upon the native security context.

42. The method of claim 34, wherein the request is a context request message that includes an identifier corresponding to the mobile device and an indication that the mobile device has been authenticated by the differing network node.

43. The method of claim 34, wherein the request includes the mobility message integrity protected utilizing the native security context.

44. A wireless communications apparatus, comprising:
at least one processor of a network node configured to:
receive a request for a native security context of a mobile device retained in memory of the network node from a differing network node within a core network, the request responsive to a mobility message integrity protected by a security context from the mobile device after an inter-system handover of the mobile device;
authenticate the mobile device based at least in part upon information included in the request; and
send the native security context to the differing network node when the mobile device is authenticated.

45. The wireless communications apparatus of claim 44, wherein the request includes a modified mobility message, wherein parameters of the mobility message associated with a mapped security context are replaced with additional parameters associated with the native security context carried in optional information elements.

46. The wireless communications apparatus of claim 44, wherein the request includes the mobility message integrity protected utilizing a mapped security context and including optional information elements that carry additional parameters associated with the native security context.

47. The wireless communications apparatus of claim 46, wherein the additional parameters include a non-access stratum message authentication code and a non-access stratum uplink counter based upon the native security context.

48. The wireless communications apparatus of claim 44, wherein the request is a context request message that includes an identifier corresponding to the mobile device and an indication that the mobile device has been authenticated by the differing network node.

49. The wireless communications apparatus of claim 44, wherein the request includes the mobility message integrity protected utilizing the native security context.

50. An apparatus at a network node of a communication network, comprising:
means for obtaining a request for a native security context of a mobile device from a differing network node within a core network;
means for authenticating the mobile device based at least in part upon information included in the request; and
means for transmitting the native security context to the differing network node when the mobile device is authenticated.

51. The apparatus of claim 50, further comprising means for evaluating an integrity of a mobility message included with the request utilizing the native security context.

52. The apparatus of claim 51, further comprising means for exchanging parameters of the mobility message with parameters carried by optional information elements of the mobility message.

53. A computer program product, comprising:
a non-transitory computer-readable medium having stored thereon code comprising:
code for causing at least one computer of a network node of a communication network to obtain a request for a native security context of a mobile device from a differing network node within a core network;
code for causing at least one computer of the network node of the communication network to authenticate the mobile device based at least in part upon information included in the request; and
code for causing at least one computer of the network node of the communication network to transmit the native security context to the differing network node when the mobile device is authenticated.

54. The computer program product of claim 53, wherein the computer-readable medium further includes code stored thereon comprising code for causing at least one computer of the network node of the communication network to check an integrity of a mobility message included with the request utilizing the native security context.

55. The computer program product of claim 54, wherein the computer-readable medium further includes code stored thereon comprising code for causing at least one computer of the network node of the communication network to substitute parameters of the mobility message with parameters carried by optional information elements of the mobility message.

56. An apparatus at a network node of a communication network, comprising:
means for authenticating a mobile device based at least in part upon information included in a request for a native security context received from a differing network node within a core network; and
means for forwarding the native security context to the differing network node when the mobile device is authenticated.

57. The apparatus of claim 56, further comprising means for evaluating an integrity of a mobility message included in the request utilizing the native security context.

58. A method, comprising:
generating, by a terminal, a mobility message after an inter-system handover;
protecting, by the terminal, an integrity of the mobility message utilizing a security context to yield an integrity protected mobility message; and
transmitting, by the terminal, the integrity protected mobility message intended for a network node in a core network, the integrity protected mobility message to permit the network node to fetch a native security context from a disparate network node within the core network.

59. The method of claim 58, wherein the mobility message is a tracking area update request message.

60. The method of claim 58, wherein the network node and the disparate network node are mobility management entities and the core network is an evolved packet system core network.

61. The method of claim 58, further comprising protecting the integrity of the mobility message utilizing a mapped security context derived from a differing native security context of a differing type of system.

62. The method of claim 61, further comprising:
generating additional parameters based upon the native security context; and
including the additional parameters in optional information elements of the integrity protected mobility message.

63. The method of claim 62, wherein the additional parameters include a non-access stratum message authentication code and a non-access stratum uplink counter based upon the native security context.

64. The method of claim 58, further comprising protecting the integrity of the mobility message utilizing the native security context.

65. A wireless communications apparatus, comprising:
at least one processor of a terminal configured to:
generate a mobility message after an inter-system handover;
protect an integrity of the mobility message utilizing a security context to yield an integrity protected mobility message; and
transmit the integrity protected mobility message intended for a network node in a core network, the integrity protected mobility message to permit the network node to fetch a native security context from a disparate network node within the core network.

66. The wireless communications apparatus of claim 65, further comprising:
at least one processor configured to:
protect the integrity of the mobility message utilizing a mapped security context derived from a differing native security context of a differing type of system.

67. The wireless communications apparatus of claim 66, further comprising:
at least one processor configured to:
generate additional parameters based upon the native security context; and
incorporate the additional parameters in optional information elements of the integrity protected mobility message.

68. The wireless communications apparatus of claim 67, wherein the additional parameters include a non-access stratum message authentication code and a non-access stratum uplink counter based upon the native security context.

69. The wireless communications apparatus of claim 65, further comprising:

at least one processor configured to:

protect the integrity of the mobility message utilizing the native security context.

70. An apparatus, comprising:

means for yielding a mobility message after an inter-system handover;

means for protecting an integrity of the mobility message employing a security context to generate an integrity protected mobility message; and means for transmitting the integrity protected mobility message, the integrity protected mobility message to permit a network node to fetch a native security context from a disparate network node in a core network.

71. The apparatus of claim 70, further comprising means for including parameters associated with the native security context in optional information elements of the integrity protected mobility message.

72. A computer program product, comprising:

a non-transitory computer-readable medium having stored thereon code comprising:

code for causing at least one computer to yield a mobility message after an inter-system handover;

code for causing at least one computer to protect an integrity of the mobility message employing a security context to generate an integrity protected mobility message; and code for causing at least one computer to transmit the integrity protected mobility message, the integrity protected mobility message to permit a network node to fetch a native security context from a disparate network node in a core network.

73. The computer program product of claim 72, wherein the computer-readable medium further includes code stored thereon comprising code for causing at least one computer to incorporate parameters associated with the native security context in optional information elements of the integrity protected mobility message.

74. An apparatus, comprising:

means for area updating, for generating a mobility message after an inter-system handover; and means for protecting an integrity of the mobility message using one of a native security context or a mapped security context to yield an integrity protected mobility message for transmission to a network node in a core network to permit the network node to fetch the native security context from a disparate network node of the core network.

75. The apparatus of claim 74, further comprising means for including parameters, including a non-access stratum message authentication code and a non-access stratum uplink counter associated with the native security context, in optional information elements of the integrity protected mobility message.

* * * * *